US010281793B2

(12) United States Patent
Ohshima et al.

(10) Patent No.: US 10,281,793 B2
(45) Date of Patent: May 7, 2019

(54) ELECTROCHROMIC DIMMING DEVICE AND ELECTROCHROMIC DRIVING DEVICE

(71) Applicants: Atsushi Ohshima, Kanagawa (JP); Shigenobu Hirano, Kanagawa (JP); Keiichiroh Yutani, Kanagawa (JP); Takahiko Matsumoto, Kanagawa (JP); Hidekazu Yaginuma, Kanagawa (JP); Kazuaki Tsuji, Kanagawa (JP); Sukchan Kim, Kanagawa (JP); Yasuo Katano, Kanagawa (JP); Kohji Takeuchi, Kanagawa (JP); Shun Goto, Kanagawa (JP); Tohru Hasegawa, Kanagawa (JP); Hiroaki Kobayashi, Tokyo (JP)

(72) Inventors: Atsushi Ohshima, Kanagawa (JP); Shigenobu Hirano, Kanagawa (JP); Keiichiroh Yutani, Kanagawa (JP); Takahiko Matsumoto, Kanagawa (JP); Hidekazu Yaginuma, Kanagawa (JP); Kazuaki Tsuji, Kanagawa (JP); Sukchan Kim, Kanagawa (JP); Yasuo Katano, Kanagawa (JP); Kohji Takeuchi, Kanagawa (JP); Shun Goto, Kanagawa (JP); Tohru Hasegawa, Kanagawa (JP); Hiroaki Kobayashi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 149 days.

(21) Appl. No.: 15/155,427

(22) Filed: May 16, 2016

(65) Prior Publication Data
US 2016/0349590 A1    Dec. 1, 2016

(30) Foreign Application Priority Data

May 25, 2015  (JP) .................................. 2015-105737
Jan. 7, 2016   (JP) .................................. 2016-002091
Mar. 9, 2016   (JP) .................................. 2016-045854

(51) Int. Cl.
G02F 1/163    (2006.01)
G02F 1/155    (2006.01)
(Continued)

(52) U.S. Cl.
CPC .............. *G02F 1/163* (2013.01); *G02F 1/155* (2013.01); *G02F 1/161* (2013.01); *G09G 3/38* (2013.01);
(Continued)

(58) Field of Classification Search
CPC .......... G02F 1/163; G02F 1/161; G02F 1/155; G09G 3/38; G09G 2320/02; G09G 2310/066; G09G 2330/025
(Continued)

(56) References Cited

U.S. PATENT DOCUMENTS 6,330,101 B1 * 12/2001 Yamamoto .............. B60R 1/088
                                                              345/105
9,798,213 B2 * 10/2017 Kubo ....................... G02F 1/155
(Continued)

FOREIGN PATENT DOCUMENTS

CN       1372432 A       10/2002
CN       1839419 A        9/2006
(Continued)

OTHER PUBLICATIONS

European search report dated Sep. 2, 2016 in corresponding European Patent Application No. 16169976.4.
(Continued)

*Primary Examiner* — Tuyen Tra
(74) *Attorney, Agent, or Firm* — Cooper & Dunham LLP

(57) ABSTRACT

An electrochromic dimming device is provided. The electrochromic dimming device includes an electrochromic element, a color development power source, a color discharge powder source, and a variable resistance. The color development power source supplies electric power to the electrochromic element when the electrochromic element develops color. The color discharge powder source supplies electric power to the electrochromic element when the electrochromic element discharges color. The variable resistance is disposed on a first current path without being disposed on a second current path. The first current path is formed from the color development power source through a ground via the electrochromic element, and the second current path is formed from the color discharge power source to the ground via the electrochromic element.

15 Claims, 21 Drawing Sheets

(51) Int. Cl.
*G02F 1/161* (2006.01)
*G09G 3/38* (2006.01)

(52) U.S. Cl.
CPC ... *G09G 2310/066* (2013.01); *G09G 2320/02* (2013.01); *G09G 2330/025* (2013.01)

(58) Field of Classification Search
USPC .................................. 359/265–275; 345/105
See application file for complete search history.

(56) References Cited

U.S. PATENT DOCUMENTS

| | | |
|---|---|---|
| 2005/0052215 A1 | 3/2005 | Ohshima et al. |
| 2007/0109218 A1 | 5/2007 | Saito et al. |
| 2012/0139825 A1 | 6/2012 | Yashiro et al. |
| 2012/0223147 A1 | 9/2012 | Ohshima |
| 2017/0003563 A1 | 1/2017 | Kubo et al. |

FOREIGN PATENT DOCUMENTS

| | | |
|---|---|---|
| CN | 102540609 A | 7/2012 |
| JP | 64-031132 | 2/1989 |
| JP | 10-063216 | 3/1998 |
| JP | 2012-128217 | 7/2012 |

OTHER PUBLICATIONS

May 3, 2018 Chinese official action in connection with corresponding Chinese patent application No. 201610318354.X.

\* cited by examiner

FIG. 13

|  | FIRST VARIABLE POWER SOURCE | SECOND VARIABLE POWER SOURCE |
| --- | --- | --- |
| POSITIVE/POSITIVE | 3V | 1V |
| POSITIVE/NEGATIVE | 1V | −1V |
| NEGATIVE/POSITIVE | — | — |
| NEGATIVE/NEGATIVE | −1V | −3V |

FIG. 17

|  | FIRST VARIABLE POWER SOURCE | SECOND VARIABLE POWER SOURCE |
| --- | --- | --- |
| POSITIVE/POSITIVE | 1V | 3V |
| POSITIVE/NEGATIVE | — | — |
| NEGATIVE/POSITIVE | −1V | 1V |
| NEGATIVE/NEGATIVE | −1V | −3V |

ELECTROCHROMIC DIMMING DEVICE AND ELECTROCHROMIC DRIVING DEVICE

CROSS-REFERENCE TO RELATED APPLICATIONS

This patent application is based on and claims priority pursuant to 35 U.S.C. § 119(a) to Japanese Patent Application Nos. 2015-105737, 2016-002091, and 2016-045854, filed on May 25, 2015, Jan. 7, 2016, and Mar. 9, 2016, respectively, in the Japan Patent Office, the entire disclosure of which is hereby incorporated by reference herein.

BACKGROUND

Technical Field

The present disclosure relates to an electrochromic dimming device and an electrochromic driving device.

Description of the Related Art

Photochromic dimming elements generally control the transmittance by emission of light (e.g., ultraviolet). Unlike photochromic dimming elements, electric dimming elements use electric signals for controlling the transmittance. Electric dimming elements have an advantage that the transmittance is easily controllable by users and is automatically increased in dark places.

As electric dimming elements, liquid crystal elements and electrochromic elements are known, which are applications of liquid crystal materials and electrochromic materials, respectively. Electrochromic elements are known to be transparent when in a neutral state and to show high optical density when carrying particles of titanium oxide or the like. Therefore, electrochromic elements are advantageously used for obtaining high-contrast dimming elements.

Electrochromic elements that reversibly cause oxidation and reduction reactions upon application of a voltage generally contain a colorant which develops and discharges color by the oxidation and reduction reactions. The colorant is generally oxidized or reduced by being applied with a voltage from a driving device.

Conventional electrochromic driving devices generally perform a sequence control and a feedback control when controlling the responsiveness in color development/discharge operations or when retaining a specific density in color development operations. To perform a sequence control and a feedback control, a detection circuit is generally required for detecting electric properties of the electrochromic element, such as pole potential, impedance, injection potential, and discharge potential, as control parameters.

SUMMARY

In accordance with some embodiments of the present invention, an electrochromic dimming device is provided. The electrochromic dimming device includes an electrochromic element, a color development power source, a color discharge powder source, and a variable resistance. The color development power source supplies electric power to the electrochromic element when the electrochromic element develops color. The color discharge powder source supplies electric power to the electrochromic element when the electrochromic element discharges color. The variable resistance is disposed on a first current path without being disposed on a second current path. The first current path is formed from the color development power source through a ground via the electrochromic element, and the second current path is formed from the color discharge power source to the ground via the electrochromic element.

In accordance with some embodiments of the present invention, an electrochromic driving device is provided. The electrochromic driving device includes an electrochromic element, a variable power source, a driving switch, a short-circuiting switch, and a controller. The electrochromic element has a first pole and a second pole. The variable power source variably supplies electric power to the electrochromic element. The driving switch connects each of the first pole and the second pole of the electrochromic element to the variable power source or a circuit reference potential. The short-circuiting switch short-circuits or opens the first pole and the second pole. The controller controls the driving switch, the short-circuiting switch, and the variable power source.

In accordance with some embodiments of the present invention, an electrochromic driving device is provided. The electrochromic driving device includes an electrochromic element, a variable power source, an element driver, and a controller. The variable power source outputs a voltage to the electrochromic element while varying the voltage with time according to a control signal. The element driver changes a pole of the electrochromic element to which the voltage output from the variable power source is applied according to a drive signal. The controller generates the control signal and the drive signal.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 13 is a table showing example combinations of the potential of the first variable power source with that of the second variable power source for color development operations;

FIG. 17 is a table showing example combinations of the potential of the first variable power source with that of the second variable power source for color discharge operations;

Figure 1:
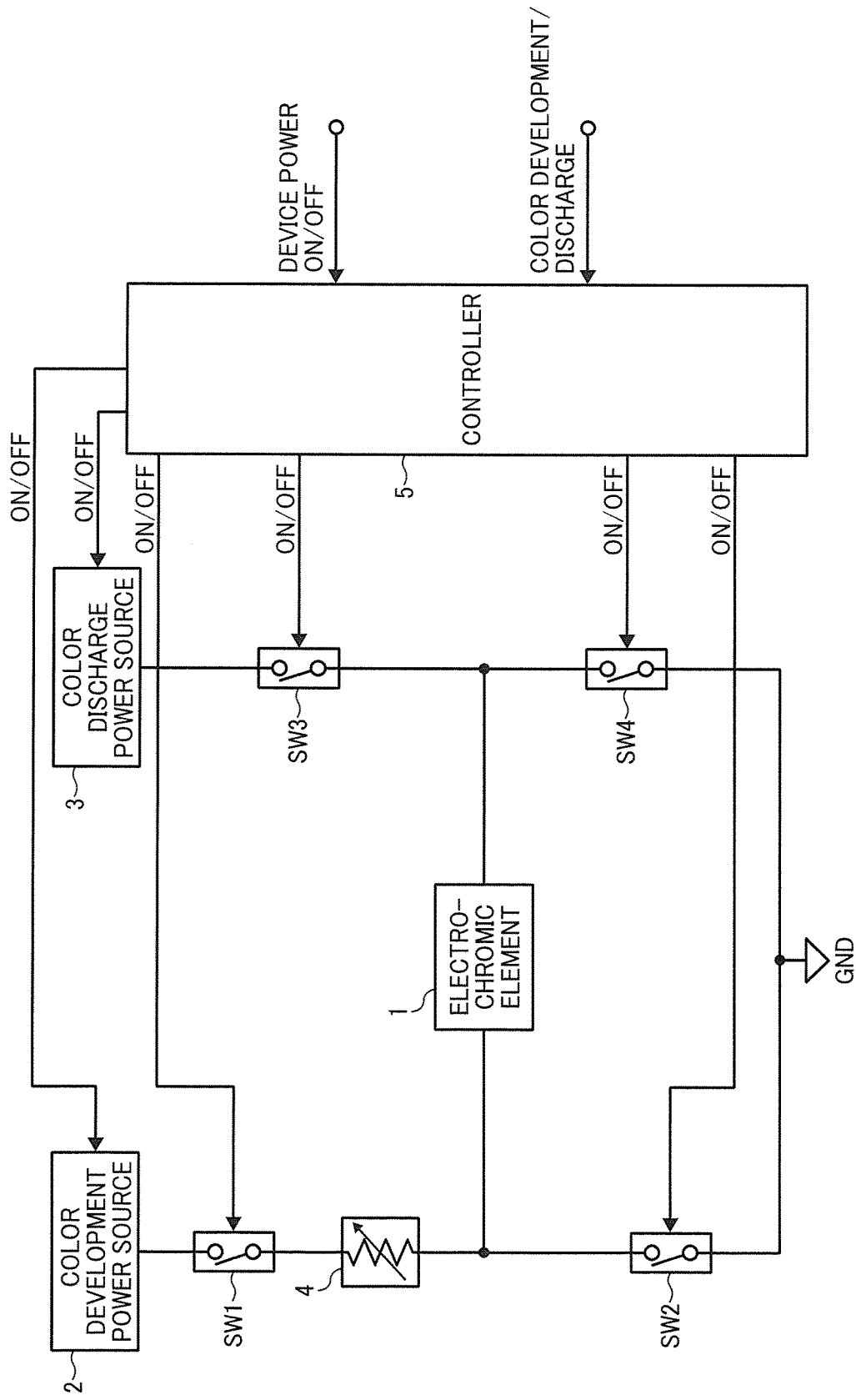
FIG. 1 is a block diagram of an electrochromic dimming device according to an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

Embodiments of the present invention are described in detail below with reference to accompanying drawings. In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

For the sake of simplicity, the same reference number will be given to identical constituent elements such as parts and materials having the same functions and redundant descriptions thereof omitted unless otherwise stated.

It is known that electrochromic elements are capable of expressing gradation as the applied voltage is controlled to control the density. Various attempts have been made to achieve driving methods for electrochromic elements which can make them express gradation.

However, an electrochromic element capable of expressing a continuous gradation and setting an arbitrary gradation has not been provided.

One object of the present invention is to solve the above-described problem and provides an electrochromic element capable of expressing a continuous gradation and setting an arbitrary gradation.

One object of the present invention is to provide an electrochromic driving device which is capable of efficiently driving an electrochromic element to develop color or discharge color without any detection circuit.

Embodiments of the present invention are described in detail below with reference to the drawings.

First, examples of parts and members used for the electrochromic dimming device according to some embodiments of the present invention are described in detail below.

Electrochromic Element

In accordance with some embodiments of the present invention, the electrochromic element preferably has a device configuration which is capable of memorizing in terms of responsiveness and power consumption. More specifically, the electrochromic element is preferably composed of a conductive or semiconductive nanostructural body (e.g., conductive or semiconductive particle) to which an electrochromic compound is adsorbed.

Electrochromic Compound

The electrochromic compound is defined as a material which changes its color by causing an oxidization reaction or a reduction reaction. Examples of such materials include polymer-based, dye-based, metal-complex-based, and metal-oxide-based electrochromic compounds.

Specific examples of polymer-based and dye-based electrochromic compounds include, but are not limited to, low-molecular-weight organic electrochromic compounds of azobenzene type, anthraquinone type, diarylethene type, dihydroprene type, styryl type, styrylspiropyran type, spirooxazine type, spirothiopyran type, thioindigo type, tetrathiafulvalene type, terephthalic acid type, triphenylmethane type, triphenylamine type, naphthopyran type, viologen type, pyrazoline type, phenazine type, phenylenediamine type, phenoxazine type, phenothiazine type, phthalocyanine type, fluoran type, fulgide type, benzopyran type, and metallocene type; and conductive polymer compounds such as polyaniline and polythiophene.

Among these compounds, dipyridine compounds represented by the following formula (1) are preferable. Since these compounds have a low color development-discharge potential, they can provide excellent color values by a reduction potential even when used for an electrochromic display device having multiple display electrodes.

Formula (1)

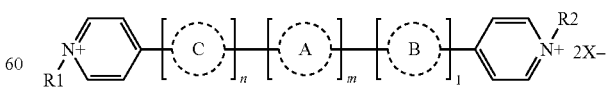

In the formula (1), each of R1 and R2 independently represents an alkyl or aryl group having 1 to 30 carbon atoms which may have a substituent; X represents a monovalent anion; each of n, m, and l independently represents an integer of 0 or 1; and each of A, B, and C independently represents an aryl or heterocyclic group having 2 to 20 carbon atoms which may have a substituent.

Specific examples of metal-complex-based and metal-oxide-based electrochromic compounds include, but are not limited to, inorganic electrochromic compounds such as titanium oxide, vanadium oxide, tungsten oxide, indium oxide, iridium oxide, nickel oxide, and Prussian Blue.

Conductive or Semiconductive Nanostructural Body

The conductive or semiconductive nanostructural body is defined as a structural body having a nanometer-scale irregularity, such as a nanoparticle and a nanoporous structural body. In a case in which the electrochromic compound has phosphonate group, phosphate group, or carboxyl group as a bonding or adsorption structure, the electrochromic compound can be easily combined with the nanostructural body to become an electrochromic composition having excellent color developing stability. In another case in which the electrochromic compound has silyl group or silanol group, the electrochromic compound can be strongly bonded with the nanostructural body via siloxane bonds to become an electrochromic composition having good stability. The siloxane bond is defined as a chemical bond between a silicon atom and an oxygen atom. The electrochromic composition is not limited in bonding structure or configuration so long as it has a configuration in which the electrochromic compound and the nanostructural body are bonded with each other via siloxane bonds.

The conductive or semiconductive nanostructural body is preferably composed of a metal oxide in terms of transparency and conductivity. Specifically, metal oxides composed primarily of the following compounds are preferable: titanium oxide, zinc oxide, tin oxide, zirconium oxide, cerium oxide, yttrium oxide, boron oxide, magnesium oxide, strontium titanate, potassium titanate, barium titanate, calcium titanate, calcium oxide, ferrite, hafnium oxide, tungsten oxide, iron oxide, copper oxide, nickel oxide, cobalt oxide, barium oxide, strontium oxide, vanadium oxide, aluminosilicate, and calcium phosphate. Each of these metal oxides can be used either alone or in combination with the others.

In view of electric properties (e.g., electric conductivity) and physical properties (e.g., optical property), the color development-discharge response speed becomes high when at least one of the following metal oxides or a mixture of any of the following metal oxides is used: titanium oxide, zinc oxide, tin oxide, zirconium oxide, iron oxide, magnesium oxide, indium oxide, and tungsten oxide.

The metal oxide is preferably in the form of a fine particle having an average primary particle diameter of 30 nm or less. The smaller the particle diameter of the metal oxide, the greater the light transmittance and the surface area per unit volume (hereinafter "specific surface area") of the metal oxide. When having a large specific surface area, the nanostructural body is capable of bearing the electrochromic compound in an efficient manner, thus providing a multi-color display with an excellent display contrast ratio between color development and discharge. The nanostructural body preferably has a specific surface area of 100 $m^2/g$ or more.

Variable Resistance

The variable resistance is not limited in structure so long as its resistance value is externally controllable. Since voltage-dependent gradation of the electrochromic element is linear in many cases, it is preferable that the resistance value is variable in a linear manner in response to externally-input data, such as the amount of slide or rotation.

Color Development Power Source and Color Discharge Power Source

In accordance with some embodiments of the present invention, a voltage to be applied to the electrochromic element can be set by the variable resistance. Therefore, the color development power source and the color discharge power source are not limited in structure so long as they can output a constant voltage. In terms of portability, button batteries and polymer-type lithium ion batteries are preferably used as the color development power source and the color discharge power source.

Switch

Specific examples of the switches include, but are not limited to, mechanical switches (e.g., relay), analog switches (e.g., semiconductors), and MOS (metal-oxide-semiconductor) transistor switches.

Controller

The controller is not limited in structure so long as it is capable of sending control signals to the color development power source, the color discharge power source, and the switches. The controller may be equipped with a power source for driving the controller, if needed.

Electric Wiring

The electric wiring is not limited in structure so long as it has a resistance value needed for transmitting electric signals to the electrochromic element. For example, conducting wires with insulating coating and flexible wires can be used. When space-saving is demanded, flexible wires are preferably used.

Next, examples of a block diagram and an operation of the electrochromic dimming device according to some embodiments of the present invention are described below.

First Embodiment

FIG. 1 is a block diagram of an electrochromic dimming device according to an embodiment of the present invention.

Referring to FIG. 1, the electrochromic dimming device includes an electrochromic element 1, a color development power source 2, a color discharge power source 3, a variable resistance 4, a controller 5, a first switch SW1, a second switch SW2, a third switch SW3, a fourth switch SW4, and electric wirings connecting these elements.

A series circuit of the first switch SW1 and the variable resistance 4 is connected between one end (left end in FIG. 1) of the electrochromic element 1 and the color development power source 2. The second switch SW2 is connected between the left end of the electrochromic element 1 and the ground. In the series circuit, the positions of the first switch SW1 and the variable resistance 4 are exchangeable.

The third switch SW3 is connected between the other end (right end in FIG. 1) of the electrochromic element 1 and the color discharge power source 3. The fourth switch SW4 is connected between the right end of the electrochromic element 1 and the ground.

The color development power source 2 and the color discharge power source 3 supply electric power to the electrochromic element 1 when the electrochromic element 1 performs a color development operation and a color discharge operation, respectively.

To the controller 5, a device power on/off signal and a color development/discharge signal are input. The device power on/off signal is for switching the power of the electrochromic dimming device on and off. The color development/discharge signal is for switching the electrochromic element 1 between the color development operation and the color discharge operation.

The device power on/off signal and the color development/discharge signal are generated, for example, as the power switch or the operation selector switch of the device is operated.

The controller 5 outputs power source control signals (on/off signals) to the color development power source 2 and the color discharge power source 3 for turning them on or off in accordance with the device power on/off signal and the color development/discharge signal. The controller 5 also outputs switch control signals (on/off signals) to the first to fourth switches SW1 to SW4 for turning them on (closed) or off (opened).

Table 1 describes the type of signals (on signal or off signal) the controller 5 outputs to the first to fourth switches SW1 to SW4 at the time of color development operation and color discharge operation.

TABLE 1

|  | SW1 | SW2 | SW3 | SW4 |
|---|---|---|---|---|
| Color Development Operation | ON | OFF | OFF | ON |
| Color Discharge Operation | OFF | ON | ON | OFF |

According to Table 1, the first switch SW1 and the fourth switch SW4 are turned at the time of color development operation and turned off at the time of color discharge operation. The second switch SW2 and the third switch SW3 are turned off at the time of color development operation and turned on at the time of color discharge operation.

Accordingly, at the time of color development operation, a current path is formed from the color development power source 2 through the ground via the first switch SW1, the variable resistance 4, the electrochromic element 1, and the fourth switch SW4, in this order. At the time of color discharge operation, a current path is formed from the color discharge power source 3 through the ground via the third switch SW3, the electrochromic element 1, and the second switch SW2, in this order.

The variable resistance 4 is disposed on a current path (i.e., power transmission path) formed at the time of color development operation, but is not disposed on another current path formed at the time of color discharge operation. Therefore, a color discharge voltage that is applied from the color discharge power source 3 to the electrochromic element 1 is not affected by the variable resistance 4. In other words, the variable resistance 4 does not inhibit the color discharge power source 3 from driving the electrochromic element 1.

The variable resistance 4, the resistance value of which is variable between 10 to 500Ω, was prepared. While setting the outputs from the color development power source 2 and the color discharge power source 3 to 3.0 V and 1.0 V, respectively, and the resistance value of the variable resistance 4 to the minimum value of 10Ω, the color development operation and the color discharge operation were performed according to the switch operations described in Table 1. As a result, the transmittance of the electrochromic element 1 was 75% at the time of color development operation and was changed to 20% at the time of color discharge operation.

Next, the volume of the variable resistance 4 was controlled to increase the resistance value thereof while a color development voltage was being applied thereto. As a result, the transmittance of the electrochromic element 1 was continuously increased from 20% and kept at a constant value for a predetermined time upon termination of the volume control. Next, a color discharge voltage was applied.

As a result, the electrochromic element 1 rapidly discharged its color without remaining residual color since the variable resistance 4 was not included in the current path.

Second Embodiment

Figure 2:
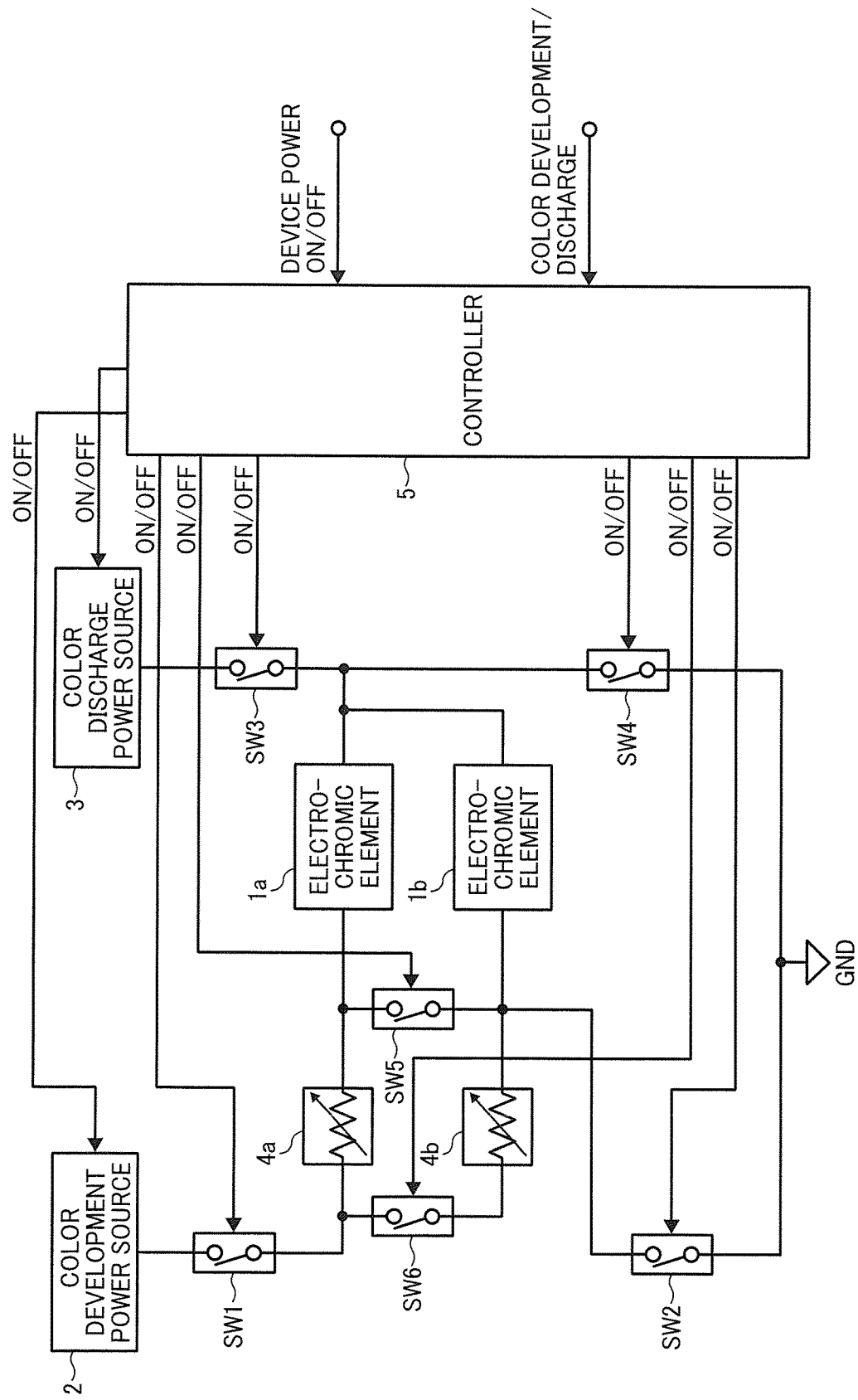
FIG. 2 is a block diagram of an electrochromic dimming device according to an embodiment of the present invention.

FIG. 2 is a block diagram of an electrochromic dimming device according to an embodiment of the present invention. In FIG. 2, the same reference numbers are given to constituent elements identical to those illustrated in FIG. 1.

Referring to FIG. 2, the electrochromic dimming device includes a first electrochromic element 1a, a second electrochromic element 1b, a color development power source 2, a color discharge power source 3, a first variable resistance 4a, a second variable resistance 4b, a controller 5, a first switch SW1, a second switch SW2, a third switch SW3, a fourth switch SW4, a fifth switch SW5, a sixth switch SW6, and electric wirings connecting the above elements.

The first variable resistance 4a and the first switch SW1 are connected in series between one end (left end in FIG. 2) of the first electrochromic element 1a and the color development power source 2 with the first variable resistance 4a being closer to the left end of the first electrochromic element 1a.

The fifth switch SW5 and the second switch SW2 are connected in series between the left end of the first electrochromic element 1a and the ground with the fifth switch SW5 being closer to the left end of the first electrochromic element 1a.

The third switch SW3 is connected between the other end (right end in FIG. 2) of the first electrochromic element 1a and the color discharge power source 3. The fourth switch SW4 is connected between the right end of the first electrochromic element 1a and the ground.

One end (left end in FIG. 2) of the second electrochromic element 1b is connected to between the fifth switch SW5 and the second switch SW2. A series circuit of the second variable resistance 4b and the sixth switch SW6 is connected to between the fifth switch SW5 and the second switch SW2 and further connected to between the first variable resistance 4a and the first switch SW1. In the series circuit, the positions of the second variable resistance 4b and the sixth switch SW6 are exchangeable.

The third switch SW3 is connected between the other end (right end in FIG. 2) of the second electrochromic element 1b and the color discharge power source 3. The fourth switch SW4 is connected between the right end of the second electrochromic element 1b and the ground.

Table 2 describes the type of signals (on signal or off signal) the controller 5 outputs to the first to sixth switches SW1 to SW6 at the time of color development operation and color discharge operation.

TABLE 2

|  | SW1 | SW2 | SW3 | SW4 | SW5 | SW6 |
|---|---|---|---|---|---|---|
| Color Development Operation | ON | OFF | OFF | ON | OFF | ON |
| Color Discharge Operation | OFF | ON | ON | OFF | ON | OFF |

According to Table 1, the first switch SW1, the fourth switch SW4, and the sixth switch SW6 are turned on at the time of color development operation and turned off at the time of color discharge operation. The second switch SW2, the third switch SW3, and the fifth switch SW5 are turned off at the time of color development operation and turned on at the time of color discharge operation.

Accordingly, at the time of color development operation, a current path is formed from the color development power source 2 through the ground via the first switch SW1, the first variable resistance 4a, the first electrochromic element 1a, and the fourth switch SW4, in this order. At the same time, another current path is formed from the color development power source 2 through the ground via the first switch SW1, the sixth switch SW6, the second variable resistance 4b, the second electrochromic element 1b, and the fourth switch SW4, in this order.

At the time of color discharge operation, a current path is formed from the color discharge power source 3 through the ground via the third switch SW3, the first electrochromic element 1a, the fifth switch SW5, and the second switch SW2, in this order. At the same time, another current path is formed from the color discharge power source 3 through the ground via the third switch SW3, the second electrochromic element 1b, and the second switch SW2, in this order.

Both of the first variable resistance 4a and the second variable resistance 4b are disposed on current paths formed at the time of color development operation, but are not disposed on other current paths formed at the time of color discharge operation. Therefore, a voltage which is applied from the color discharge power source 3 to the first electrochromic element 1a is not affected by the first variable resistance 4a. In other words, the first variable resistance 4a does not inhibit the color discharge power source 3 from driving the first electrochromic element 1a. Similarly, a voltage which is applied from the color discharge power source 3 to the second electrochromic element 1b is not affected by the second variable resistance 4b. In other words, the second variable resistance 4b does not inhibit the color discharge power source 3 from driving the second electrochromic element 1b.

The color development operation and the color discharge operation were performed in the same manner as in the first embodiment. As a result, even in the present case in which two electrochromic elements were connected in parallel, each of the electrochromic elements was capable of providing continuous gradation and remaining a constant transmittance for a predetermined time. In addition, no delay and no residual color were observed in the color discharge operation.

First Comparative Example

Figure 3:
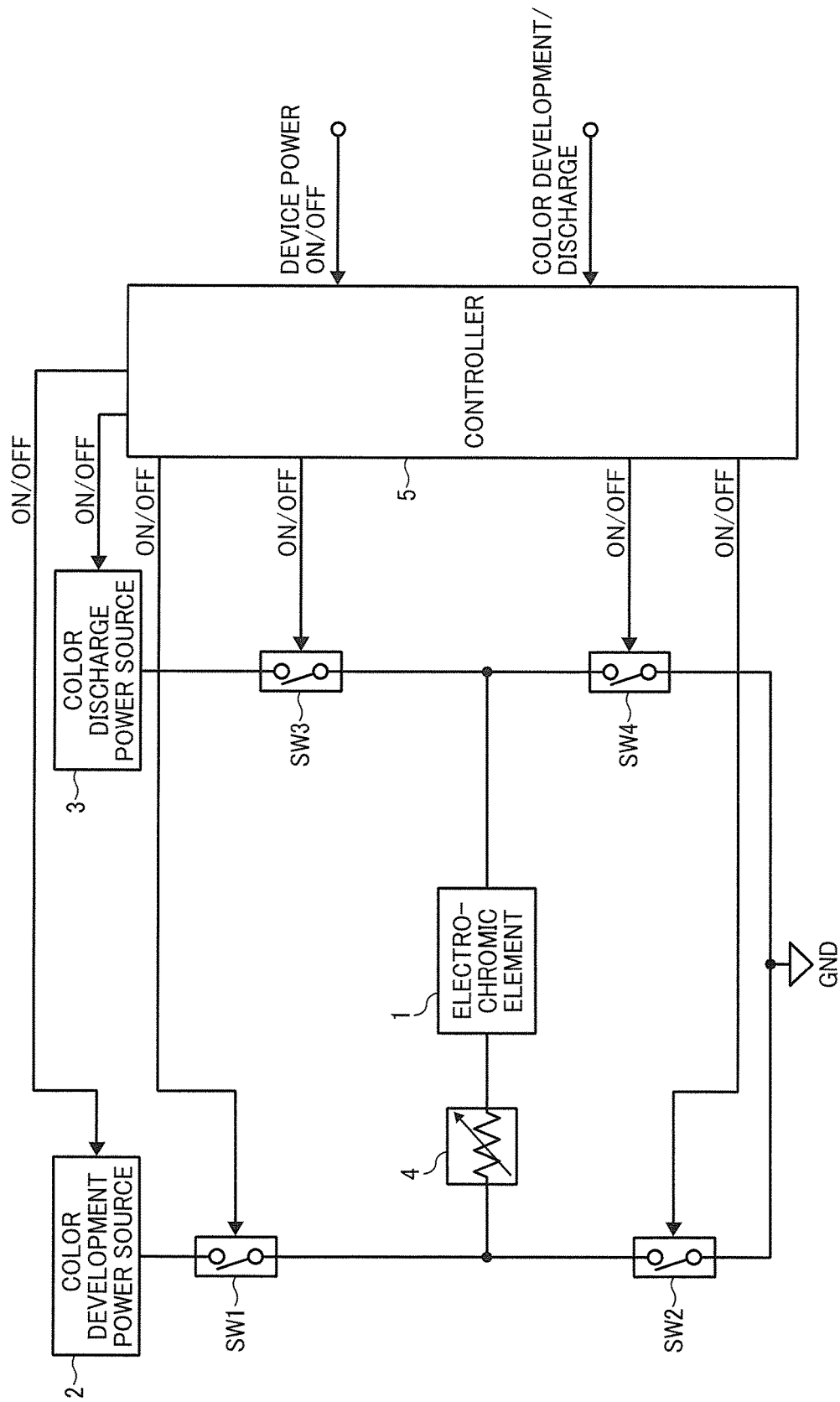
FIG. 3 is a block diagram of an electrochromic dimming device according to a first comparative example.

FIG. 3 is a block diagram of an electrochromic dimming device according to a first comparative example. In FIG. 3, the same reference numbers are given to constituent elements identical to those illustrated in FIG. 1.

The electrochromic dimming device illustrated in FIG. 3 is different from that illustrated in FIG. 1 in terms of position of the variable resistance 4.

In FIG. 1, the variable resistance 4 is included in current paths formed when the switches SW1, SW3, and SW4 are turned on. In FIG. 3, the variable resistance is also included in other current paths formed when the switches SW1, SW2, SW3, and SW4 are turned on. Namely, in FIG. 1, the following two current paths can be formed: 1) a current path passing the first switch SW1, the variable resistance 4, the electrochromic element 1, and the third switch SW3 in this order; and 2) a current path passing the first switch SW1, the variable resistance 4, the electrochromic element 1, and the fourth switch SW4 in this order. In FIG. 3, the following four current paths can be formed: 1) a current path passing the first switch SW1, the variable resistance 4, the electrochromic element 1, and the third switch SW3 in this order; 2) a current path passing the first switch SW1, the variable resistance 4, the electrochromic element 1, and the fourth switch SW4 in this order; 3) a current path passing the third switch SW3, the variable resistance 4, the electrochromic element 1, and the second switch SW2 in this order; and 4) a current path passing the second switch SW2, the variable resistance 4, the electrochromic element 1, and the fourth switch SW4 in this order.

The type of signals (on signal or off signal) the controller 5 outputs to the first to fourth switches SW1 to SW4 at the time of color development operation and color discharge operation are the same as that in the first embodiment (as described in Table 1).

Accordingly, at the time of color development operation, a current path is formed from the color development power source 2 through the ground via the first switch SW1, the variable resistance 4, the electrochromic element 1, and the fourth switch SW4, in this order.

At the time of color discharge operation, a current path is formed from the color discharge power source 3 through the ground via the third switch SW3, the electrochromic element 1, the variable resistance 4, and the second switch SW2, in this order.

Unlike the first embodiment, the variable resistance 4 is disposed on both a current path formed at the time of color development operation and another current path formed at the time of color discharge operation. Therefore, a color discharge voltage that is applied from the color discharge power source 3 to the electrochromic element 1 is affected by the variable resistance 4. In other words, the variable resistance 4 inhibits the color discharge power source 3 from driving the electrochromic element 1.

The color development operation and the color discharge operation were performed in the same manner as in the first embodiment. The result of the color development operation was the same as that in the first embodiment. However, in the color discharge operation, the color discharge speed of the electrochromic element 1 was lowered by the effect of the variable resistance 4 and residual color was remaining in the electrochromic element 1.

Second Comparative Example

Figure 4:
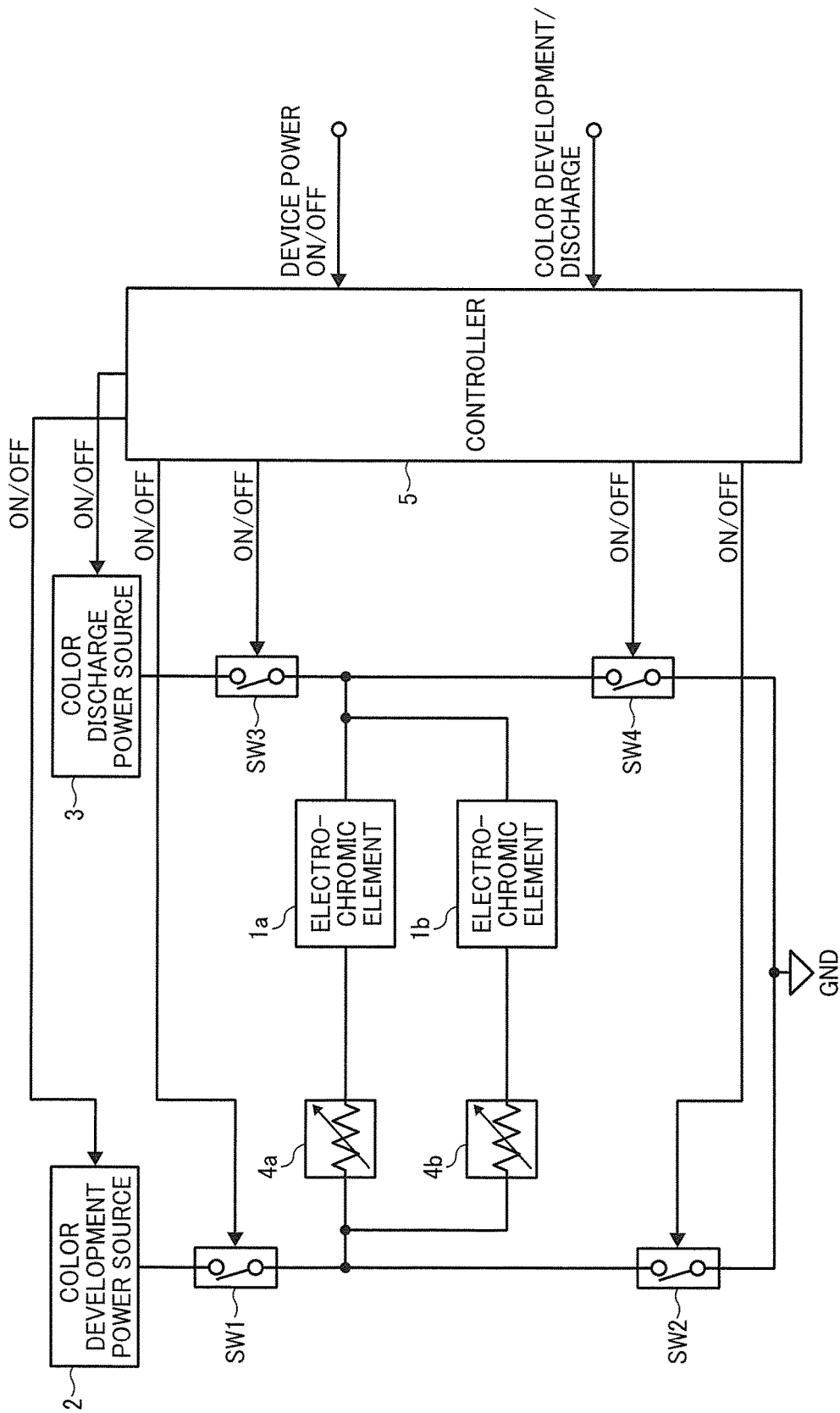
FIG. 4 is a block diagram of an electrochromic dimming device according to a second comparative example.

FIG. 4 is a block diagram of an electrochromic dimming device according to a second comparative example. In FIG. 4, the same reference numbers are given to constituent elements identical to those illustrated in FIG. 1 or FIG. 2.

The electrochromic dimming device according to the second comparative example (FIG. 4) has the same configuration as that according to the first comparative example (FIG. 3) except that the series circuit of the variable resistance 4 and the electrochromic element 1 in FIG. 3 is replaced with a parallel circuit of a first series circuit including the first variable resistance 4a and the first electrochromic element 1a and a second series circuit including the second variable resistance 4b and the second electrochromic element 1b. The type of signals (on signal or off signal) the controller 5 outputs to the first to fourth switches SW1 to SW4 at the time of color development operation and color discharge operation are the same as that in the first comparative example (as described in Table 1).

Accordingly, at the time of color development operation, a current path is formed from the color development power source 2 through the ground via the first switch SW1, the first variable resistance 4a, the first electrochromic element 1a, and the fourth switch SW4, in this order. At the same time, another current path is formed from the color discharge power source 3 through the ground via the first switch SW1, the second variable resistance 4b, the second electrochromic element 1b, and the fourth switch SW4, in this order.

At the time of color discharge operation, a current path is formed from the color discharge power source 3 through the ground via the third switch SW3, the first electrochromic element 1a, the first variable resistance 4a, and the second switch SW2, in this order. At the same time, another current path is formed from the color discharge power source 3 through the ground via the third switch SW3, the second electrochromic element 1b, the second variable resistance 4b, and the second switch SW2, in this order.

Both of the first variable resistance 4a and the second variable resistance 4b are disposed on current paths formed at the time of color development operation, and are also disposed on other current paths formed at the time of color discharge operation. Therefore, color discharge voltages that are applied from the color discharge power source 3 to the first electrochromic element 1a and the second electrochromic element 1b are affected by the first variable resistance 4a and the second variable resistance 4b, respectively. In other words, the first variable resistance 4a and the second variable resistance 4b inhibit the color discharge power source 3 from driving the first electrochromic element 1a and the second electrochromic element 1b, respectively.

The color development operation and the color discharge operation were performed in the same manner as in the second embodiment. The result of the color development operation was the same as that in the second embodiment. However, in the color discharge operation, the color discharge speeds of the first electrochromic element 1a and the second electrochromic element 1b were lowered by the effect of the first variable resistance 4a and the second variable resistance 4b and residual color was remaining in the first electrochromic element 1a and the second electrochromic element 1b.

In accordance with some embodiments of the present invention, an electrochromic dimming device capable of displaying continuous gradation and arbitrarily setting gradation is provided.

In the electrochromic dimming device according to an embodiment of the present invention, multiple electrochromic elements can be connected in parallel. Examples of such an electrochromic dimming device include electrochromic dimming eyeglasses. In such electrochromic dimming eyeglasses, even when one of the two electrochromic elements is broken and replaced with a new one, it is easy to adjust the property difference between the two electrochromic elements caused due to aging deterioration of the existing electrochromic element.

Next, the electrochromic driving device according to some embodiments of the present invention is described below.

Figure 5:
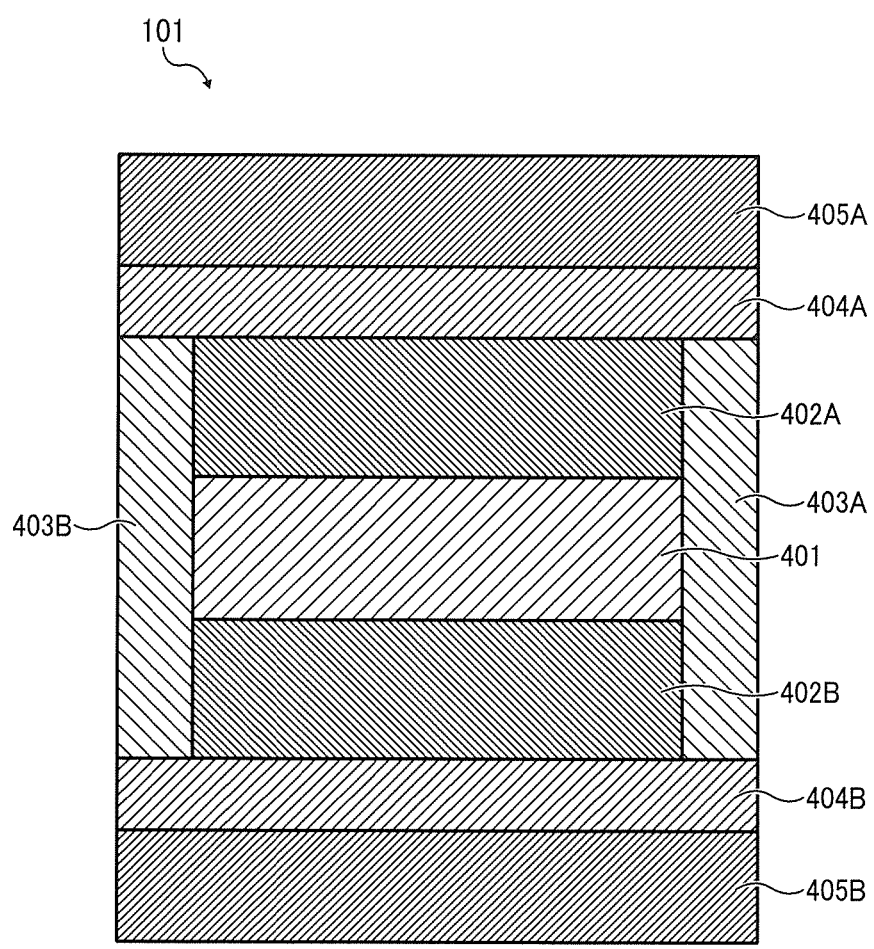
FIG. 5 is a cross-sectional view of an electrochromic element according to an embodiment of the present invention in the direction of lamination.

FIG. 5 is a cross-sectional view of an electrochromic element according to an embodiment of the present invention in the direction of lamination. Referring to FIG. 5, an electrochromic element 101 (hereinafter "EC element 101") includes: an electrolyte layer 401; a first colorant layer 402A and a second colorant layer 402B, sandwiching the electrolyte layer 401; sealants 403A and 403B, enclosing the electrolyte layer 401, the first colorant layer 402A, and the second colorant layer 402B; a first electrode 404A and a second electrode 404B, disposed adjacent to the first colorant layer 402A and the second colorant layer 402B, respectively; and a first substrate 405A and a second substrate 405B, disposed adjacent to the first electrode 404A and the second electrode 404B, respectively.

The first colorant layer 402A contains an electrochromic compound or an electrochromic composition having an absorption band in a visible wavelength range in an oxidization state. The second colorant layer 402B contains an electrochromic compound or an electrochromic composition having an absorption band in a visible wavelength range in a reduction state. Any known electrochromic compounds and electrochromic compositions can be used for these layers.

The EC element 101 operates as follows. When developing color, a positive potential and a reference potential (GND) are applied to the first electrode 404A and the second electrode 404B, respectively, thereby moving electrons from the second electrode 404B to the second colorant layer 402B. Surplus electrons unneeded for color development in the second colorant layer 402B are moved to the electrolyte layer 401. Electrons needed for color development in the first colorant layer 402A are supplied from the electrolyte layer 401. Surplus electrons unneeded for color development in the first colorant layer 402A are moved to the first electrode 404A. Thus, the EC element 101 is injected with charge.

When discharging color, a positive potential and a reference potential (GND) are applied to the second electrode 404B and the first electrode 404A, respectively, thereby moving electrons from the first electrode 404A to the first colorant layer 402A. Charges needed for color discharge are moved from the first colorant layer 402A to the electrolyte layer 401. Charges are further moved from the electrolyte layer 401 to the second colorant layer 402B. Charges needed for color discharge are moved from the second colorant layer 402B to the second electrode 404B. Charges in an amount equivalent to that of charges injected at the time of color development are discharged from the second electrode 404B.

Third Embodiment

Figure 6:
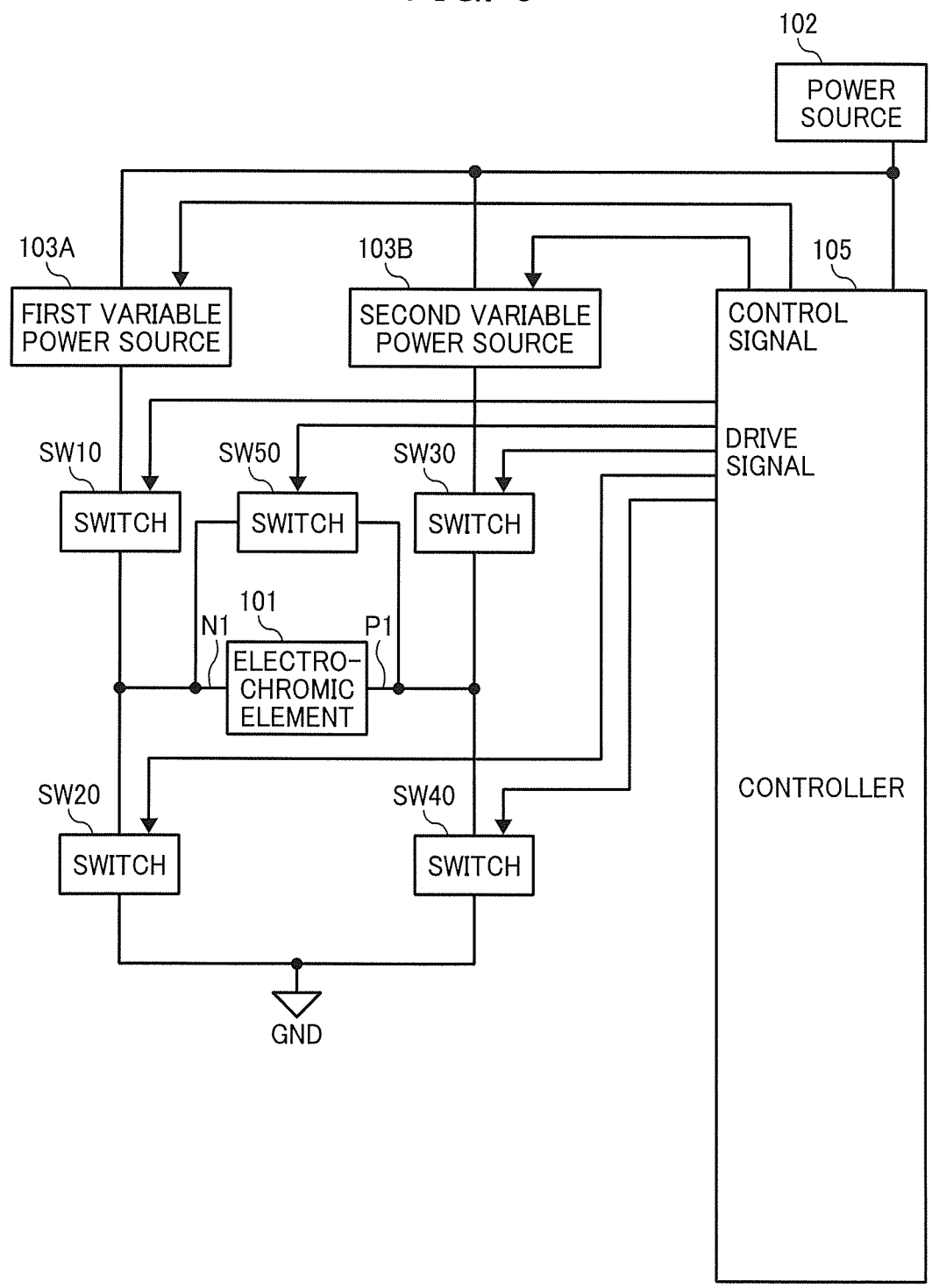
FIG. 6 is a block diagram of an electrochromic driving device according to an embodiment of the present invention.

FIG. 6 is a block diagram of an electrochromic driving device (hereinafter "EC driving device") according to an embodiment of the present invention. Referring to FIG. 6, the EC driving device includes a power source 102 to supply electric power, a first variable power source 103A, a second variable power source 103B, the EC element 101, a first switch SW10, a second switch SW20, a third switch SW30, a fourth switch SW40, a fifth switch SW50, and a controller 105.

The first variable power source 103A receives electric power supply from the power source 102. The first variable power source 103A is connected to a series circuit of the first switch SW10 and the second switch SW20. The second switch SW20 is connected to a circuit reference potential (GND).

The second variable power source 103B receives electric power supply from the power source 102. The second variable power source 103B is connected to a series circuit of the third switch SW30 and the fourth switch SW40. The fourth switch SW40 is connected to the circuit reference potential (GND).

The output terminal of the first switch SW10 is connected to one terminal of a parallel circuit of the fifth switch SW50 and the EC element 101. The other terminal of the parallel circuit of the fifth switch SW50 and the EC element 101 is connected to the output terminal of the third switch SW30.

As the first to fifth switches SW10 to SW50 are connected in the above-described manner, upon transmission of drive signals from the controller 105 to the first to fifth switches SW10 to SW50, both poles of the EC element 101 are applied with different amounts of charge. The first to fifth switches SW10 to SW50 may be hereinafter referred to as element drivers.

The controller 105 outputs control signals to the first variable power source 103A and the second variable power source 103B. The controller 105 outputs drive signals to the first switch SW10, the second switch SW20, the third switch SW30, the fourth switch SW40, and the fifth switch SW50.

Each of the first switch SW10, the second switch SW20, the third switch SW30, the fourth switch SW40, and the fifth switch SW50 may be a mechanical switch (e.g., relay), an analog switch (e.g., transmission gate), an FET (Field Effect Transistor), or a semiconductive switching element such as MOS-Tr (Metal Oxide Semiconductor Transistor).

When driving the EC element 101, the first switch SW10, the second switch SW20, the third switch SW30, and the fourth switch SW40 are used to apply voltages to a first pole N1 (oxidization pole) and a second pole P1 (reduction pole) of the EC element 101 during color development/discharge operations, and the fifth switch SW50 is used to short-circuit both poles of the EC element 101. The first switch SW10, the second switch SW20, the third switch SW30, and the fourth switch SW40 may be hereinafter referred to as driving switches, and the fifth switch SW50 may be hereinafter referred to as a short-circuiting switch. The controller 105 is capable of controlling the first to fifth switches SW10 to SW50 independently. Various levels of potentials can be applied to the both poles of the EC element 101 by controlling the first to fifth switches SW10 to SW50.

For example, by controlling the second switch SW20 and the fourth switch SW40, the first pole N1 (oxidation pole) and the second pole P1 (reduction pole) of the EC element 101 can be connected to the circuit reference potential (GND). In this case, charge transfer occurs in the EC element 101 more moderately compared to a case in which a positive potential and a negative potential are applied to the first pole N1 and the second pole P1, respectively, to discharge color of the EC element 101. Additionally, in this case, the EC element 101 comes into a state similar to self-discharge. Therefore, the EC element 101 can discharge its color with a moderate color discharge response without stress.

The fifth switch SW50 short-circuits both poles of the EC element 101 to equilibrate the potentials of the first electrode 404A and the second electrode 404B.

In a case in which the fifth switch SW50 has a low on resistance, these potentials become approximately equilibrated. When a large amount of charges exists in the EC element 101, charge transfer occurs rapidly. In a case in which the fifth switch SW50 has a high on resistance, charges in the EC element 101 are discharged due to the resistance value, thus causing charge transfer while showing discharging characteristic.

It is possible to create a suitable condition of both poles of the EC element 101 for the purpose of detection, by combining extra fifth switches SW50 varied in resistance and connecting them in parallel.

As the fifth switch SW50 short-circuits both poles of the EC element 101 in a color discharge state, an ionic reaction occurs in each constitutional layer in the EC element 101. Therefore, although the oxidation pole and the reduction pole are short-circuited, both poles are equilibrated only temporarily. As the fifth switch SW50 is then opened, a potential which is specific to the structure of the EC element 101 is generated between both poles.

Accordingly, as the fifth switch SW50 short-circuits both poles of the EC element 101 and then the fifth switch SW50 is opened, the potential between both poles returns to the potential specific to the structure of the EC element 101. The behavior of the potential between both poles of the EC element 101 is specific to the element configuration and the number of driving of the element.

In a case in which the fifth switch SW50 has a high on resistance, when the EC element 101 is in a color development state, the potentials of both poles vary until they become equilibrated.

Since the characteristic curve can be controlled not only by the on resistance but also by an external resistance, the behavior specific to the element configuration and the number of driving of the element can be detected from the curve.

In the present embodiment, the fifth switch SW50 has an on resistance. According to another embodiment, a resistive component element, such as an external resistance, may be used to arbitrarily add a resistance value.

By controlling the first to fifth switches SW10 to SW50, various short-circuit modes can be achieved. Examples of short-circuit modes are illustrated in FIGS. 7 to 10.

Figure 7:
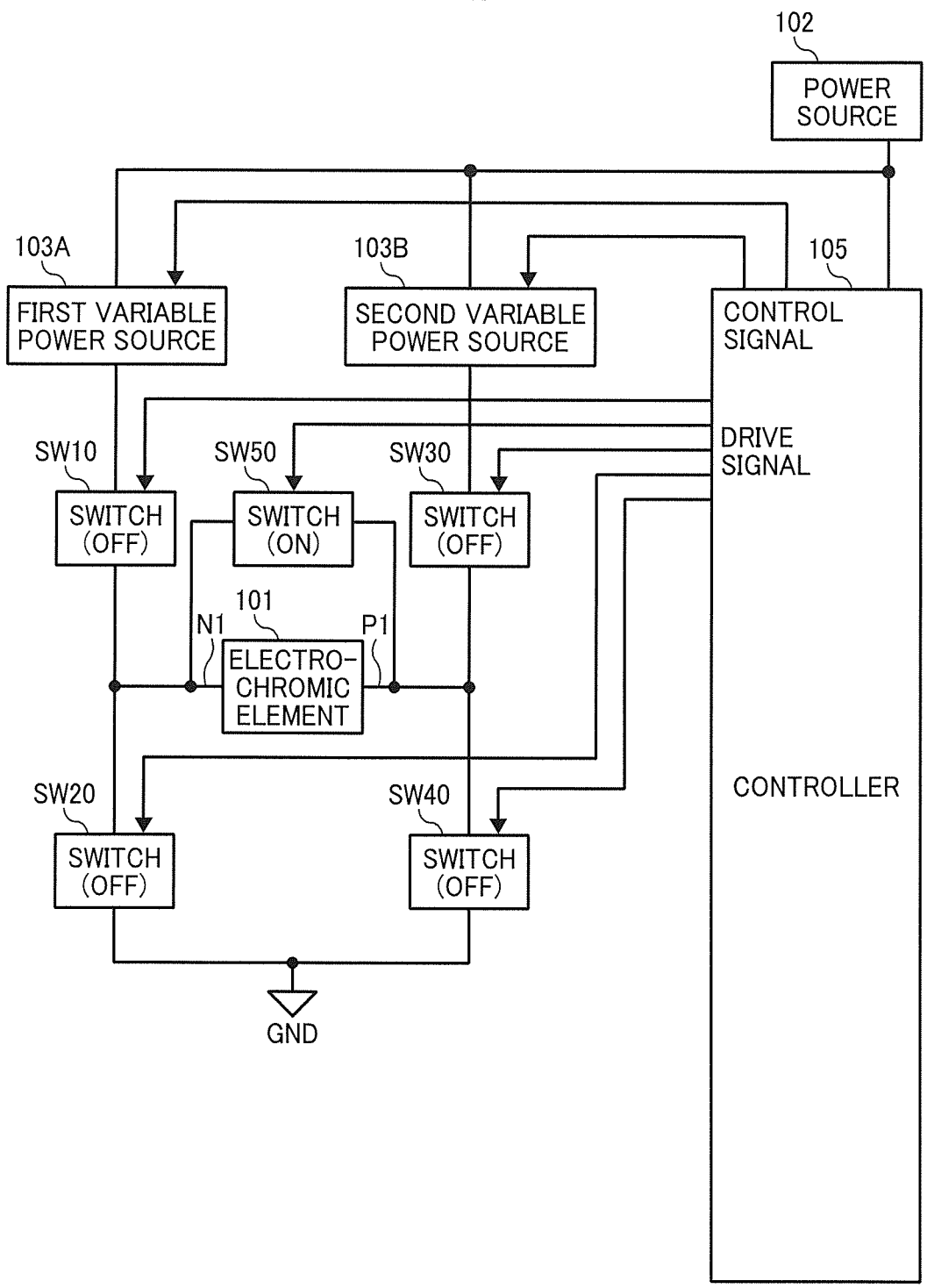
FIG. 7 is a block diagram of the electrochromic driving device illustrated in FIG. 6 in a first short-circuit mode.

FIG. 7 is a block diagram of the electrochromic driving device in a first short-circuit mode. As illustrated in FIG. 7, in the first short-circuit mode, the first switch SW10, the second switch SW20, the third switch SW30, and the fourth switch SW40 are turned off, and only the fifth switch SW50 is turned on. In this case, only both poles of the EC element 101 are short-circuited.

Figure 8:
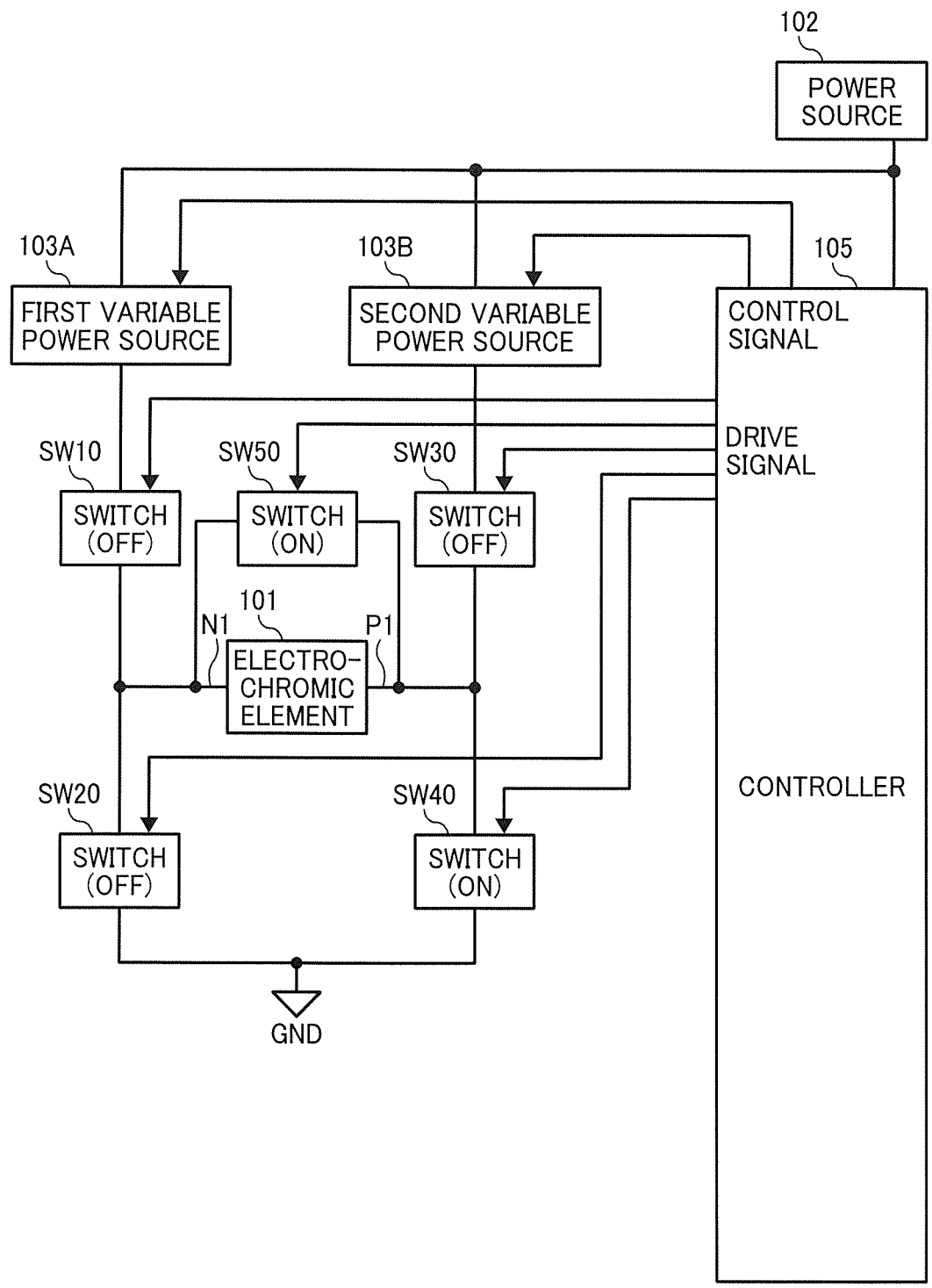
FIG. 8 is a block diagram of the electrochromic driving device illustrated in FIG. 6 in a second short-circuit mode.

FIG. 8 is a block diagram of the electrochromic driving device in a second short-circuit mode. As illustrated in FIG. 8, in the second short-circuit mode, the fourth switch SW40 and the fifth switch SW50 are turned off, and the first switch SW10, the second switch SW20, and the third switch SW30 are turned on. In this case, the second pole P1 (reduction pole) of the EC element 101 is connected to the circuit reference potential (GND) and short-circuited with the first pole N1 (oxidization pole).

Figure 9:
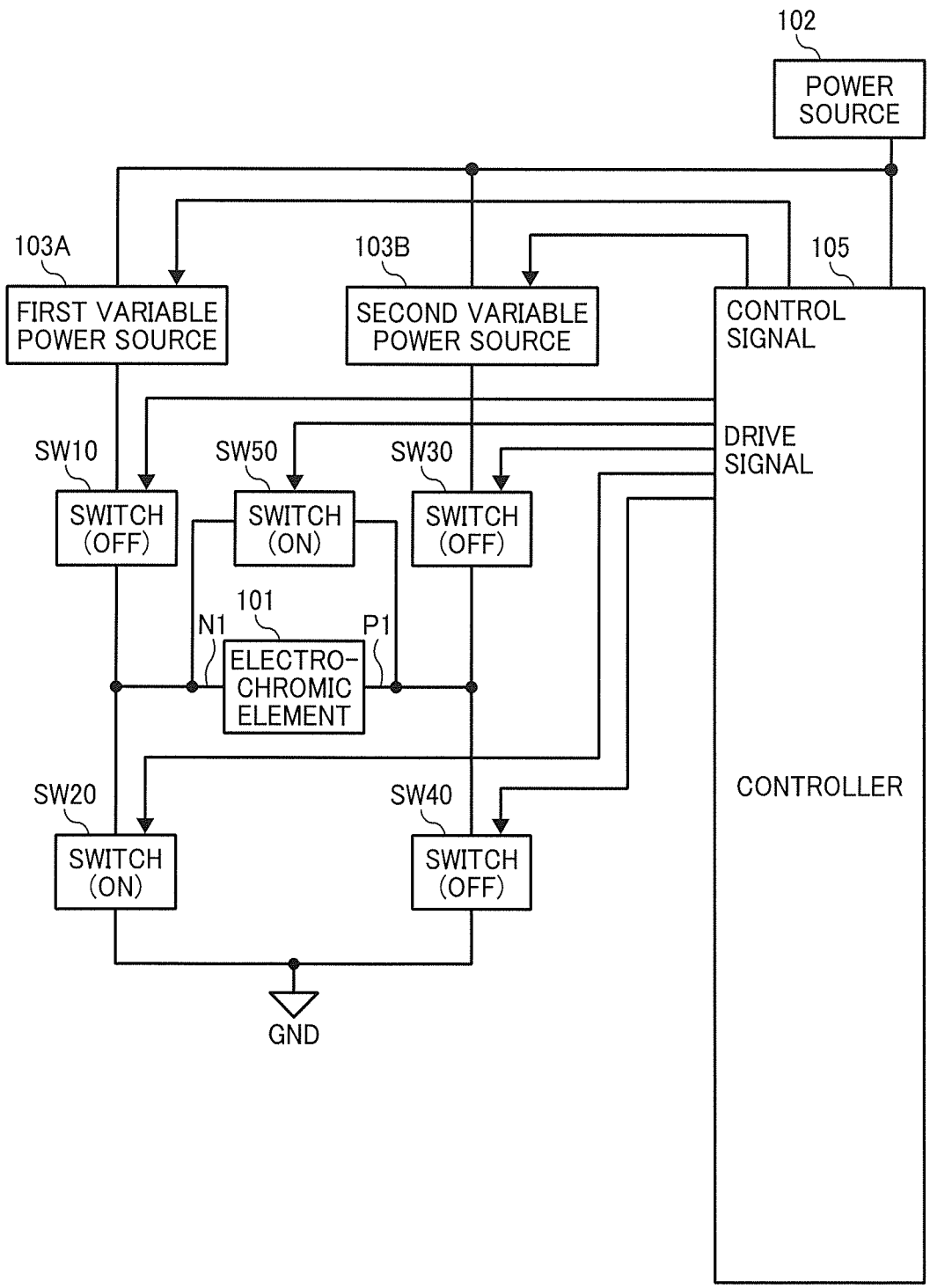
FIG. 9 is a block diagram of the electrochromic driving device illustrated in FIG. 6 in a third short-circuit mode.

FIG. 9 is a block diagram of the electrochromic driving device in a third short-circuit mode. As illustrated in FIG. 9, in the third short-circuit mode, the second switch SW20 and the fifth switch SW50 are turned on, and the first switch SW10, the third switch SW30, and the fourth switch SW40 are turned off. In this case, the first pole N1 (oxidization pole) of the EC element 101 is connected to the circuit reference potential (GND) and short-circuited with the second pole P1 (reduction pole).

Figure 10:
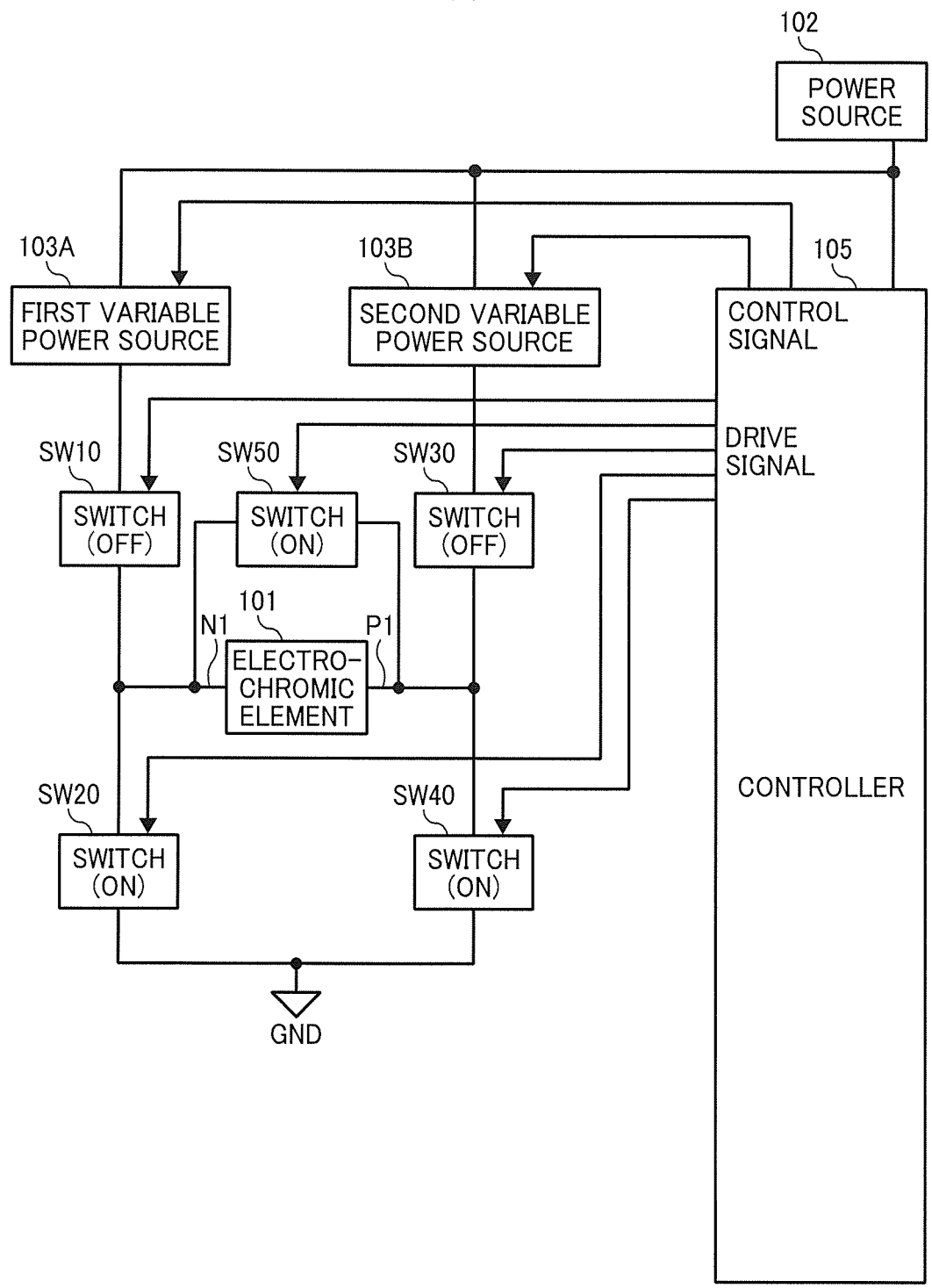
FIG. 10 is a block diagram of the electrochromic driving device illustrated in FIG. 6 in a fourth short-circuit mode.

FIG. 10 is a block diagram of the electrochromic driving device in a fourth short-circuit mode. As illustrated in FIG. 10, in the fourth short-circuit mode, the second switch SW20, the fourth switch SW40, and the fifth switch SW50 are turned on, and the first switch SW10 and the third switch SW30 are turned off. In this case, the first pole N1 (oxidization pole) and the second pole P1 (reduction pole) of the EC element 101 are both connected to the circuit reference potential (GND) and short-circuited.

Figure 11:
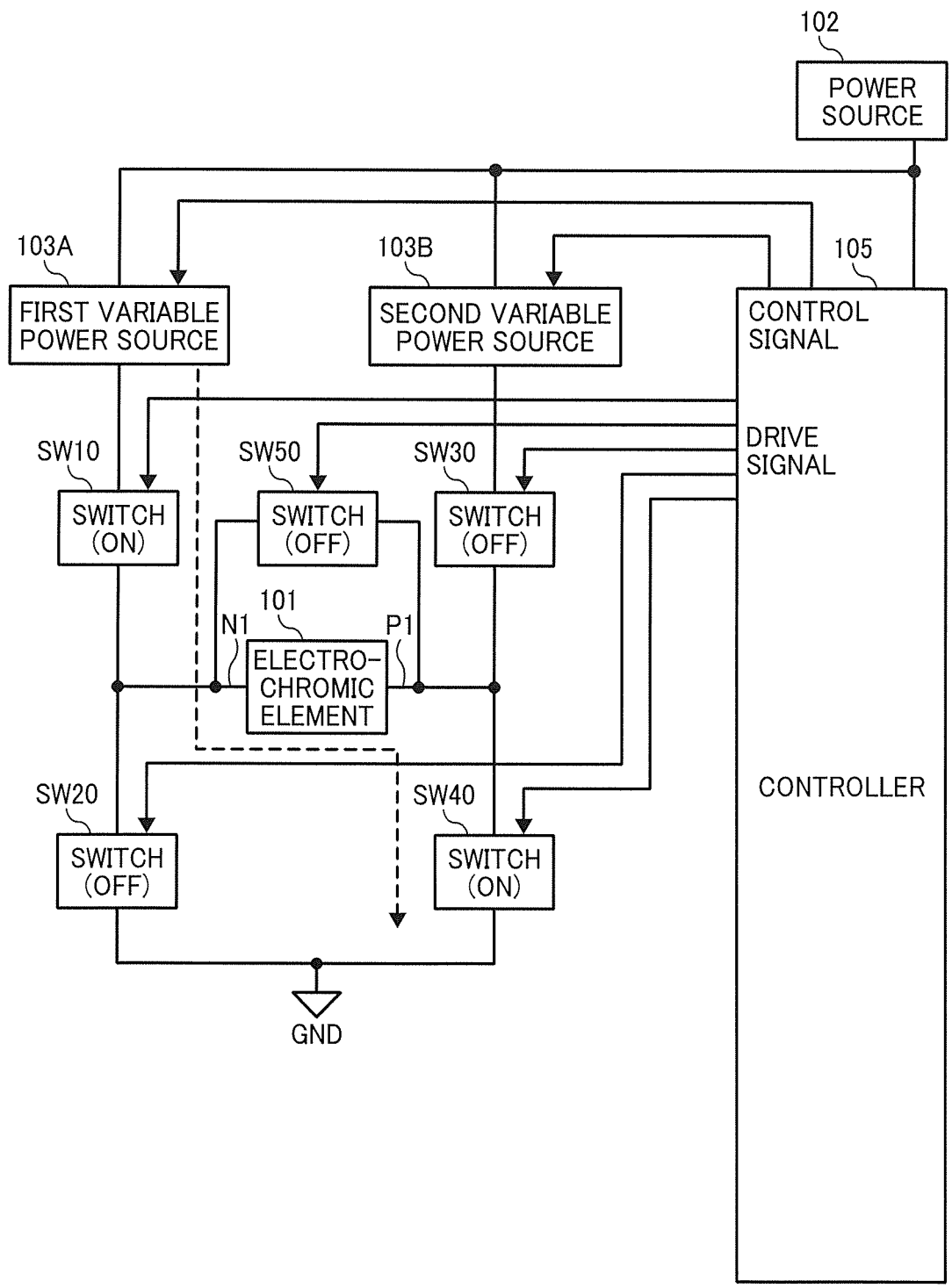
FIG. 11 is a block diagram of the electrochromic driving device illustrated in FIG. 6 in which an electrochromic element is caused to develop color by a circuit reference potential.

FIG. 11 is a block diagram of the electrochromic driving device in which the EC element 101 is caused to develop color by the circuit reference potential (GND). As illustrated in FIG. 11, in a case in which the EC element 101 is caused to develop color by the circuit reference potential (GND), the first switch SW10 and the fourth switch SW40 are turned on, and the second switch SW20, the third switch SW30, and the fifth switch SW50 are turned off. In this case, a current flows from the power source 102 through GND via the first variable power source 103A, the first switch SW10, the EC element 101 (from the first pole N1 to the second pole P1), and the fourth switch SW40, in this order, as shown by dashed arrow in FIG. 11.

Figure 12:
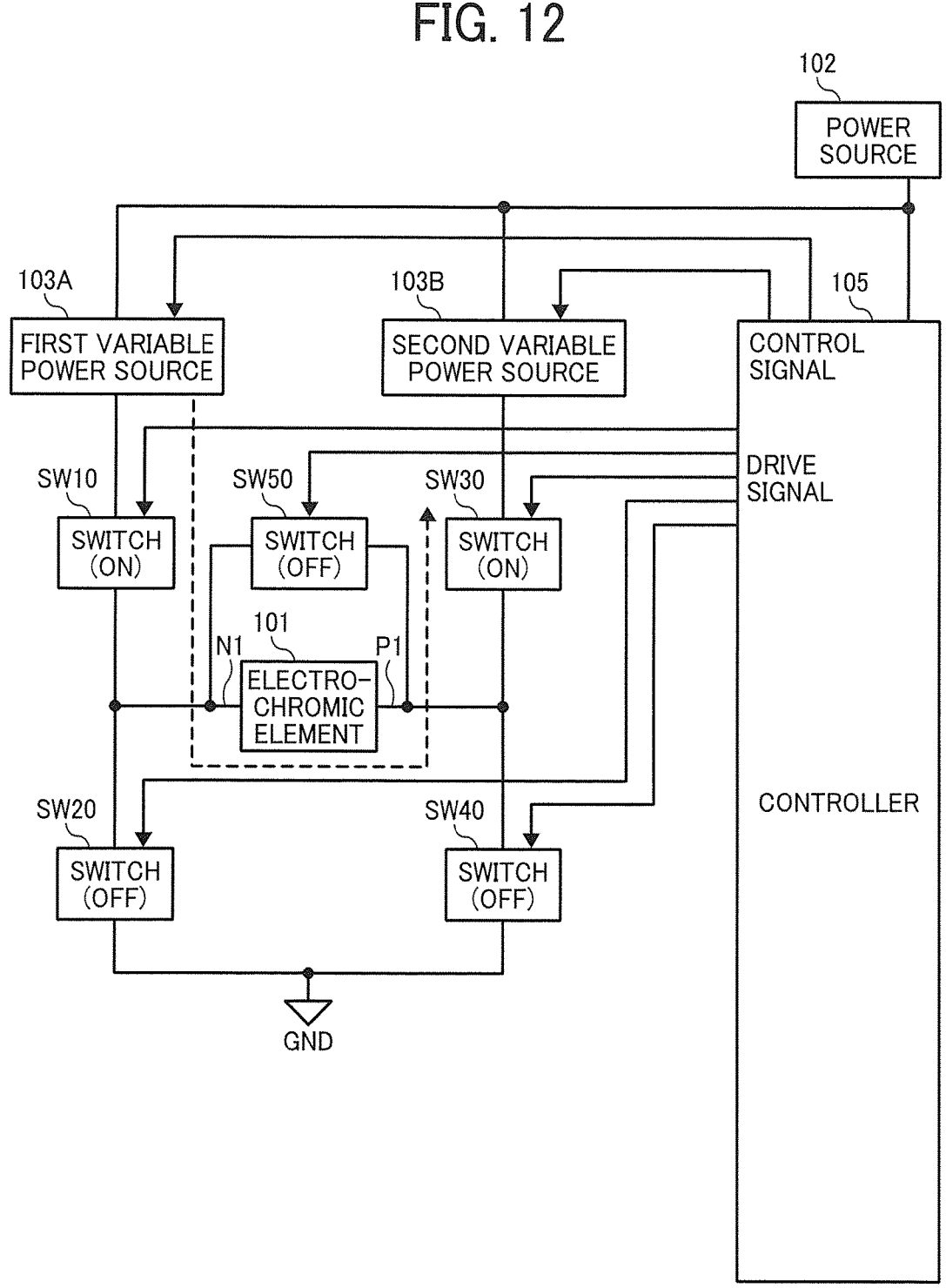
FIG. 12 is a block diagram of the electrochromic driving device illustrated in FIG. 6 in which a potential difference is applied to between a first variable power source and a second variable power source, to cause the electrochromic element to develop color by a potential difference between a first pole and a second pole of the electrochromic element.

FIG. 12 is a block diagram of the electrochromic driving device in which a potential difference is applied to between the first variable power source 103A and the second variable power source 103B, to cause the EC element 101 to develop color by the potential difference between the first pole N1 (oxidization pole) and the second pole P1 (reduction pole) thereof. As illustrated in FIG. 12, in a case in which the EC element 101 is caused to develop color by the potential difference between both poles, the first switch SW10 and the third switch SW30 are turned on, and the second switch SW20, the fourth switch SW40, and the fifth switch SW50 are turned off. In this case, a current flows from the power source 102 through the second variable power source 103B via the first variable power source 103A, the first switch SW10, the EC element 101 (from the first pole N1 to the second pole P1), and the third switch SW30, in this order, as shown by dashed arrow in FIG. 12.

In the present embodiment, since one of the oxidization pole (N1) and the reduction pole (P1) of the EC element 101 can be set as a potential reference pole as needed, a positive potential is always applied regardless of the configuration of the EC element 101.

Possible combinations of the potential of the first variable power source 103A with that of the second variable power source 103B are listed in the following Table 3.

TABLE 3

| Potential of the first variable power source 103A | Potential of the second variable power source 103B |
|---|---|
| Positive | Positive |
| Negative | Positive |
| Positive | Negative |
| Negative | Negative |

FIG. 13 is a table showing example combinations of the potential of the first variable power source 103A with that of the second variable power source 103B for color development operations. In a case in which the EC element 101 requires that the potential difference between the first pole N1 (oxidization pole) and the second pole P1 (reduction pole) be 2 V, the color development operation can be conducted under all the combination conditions described in FIG. 13.

Figure 14:
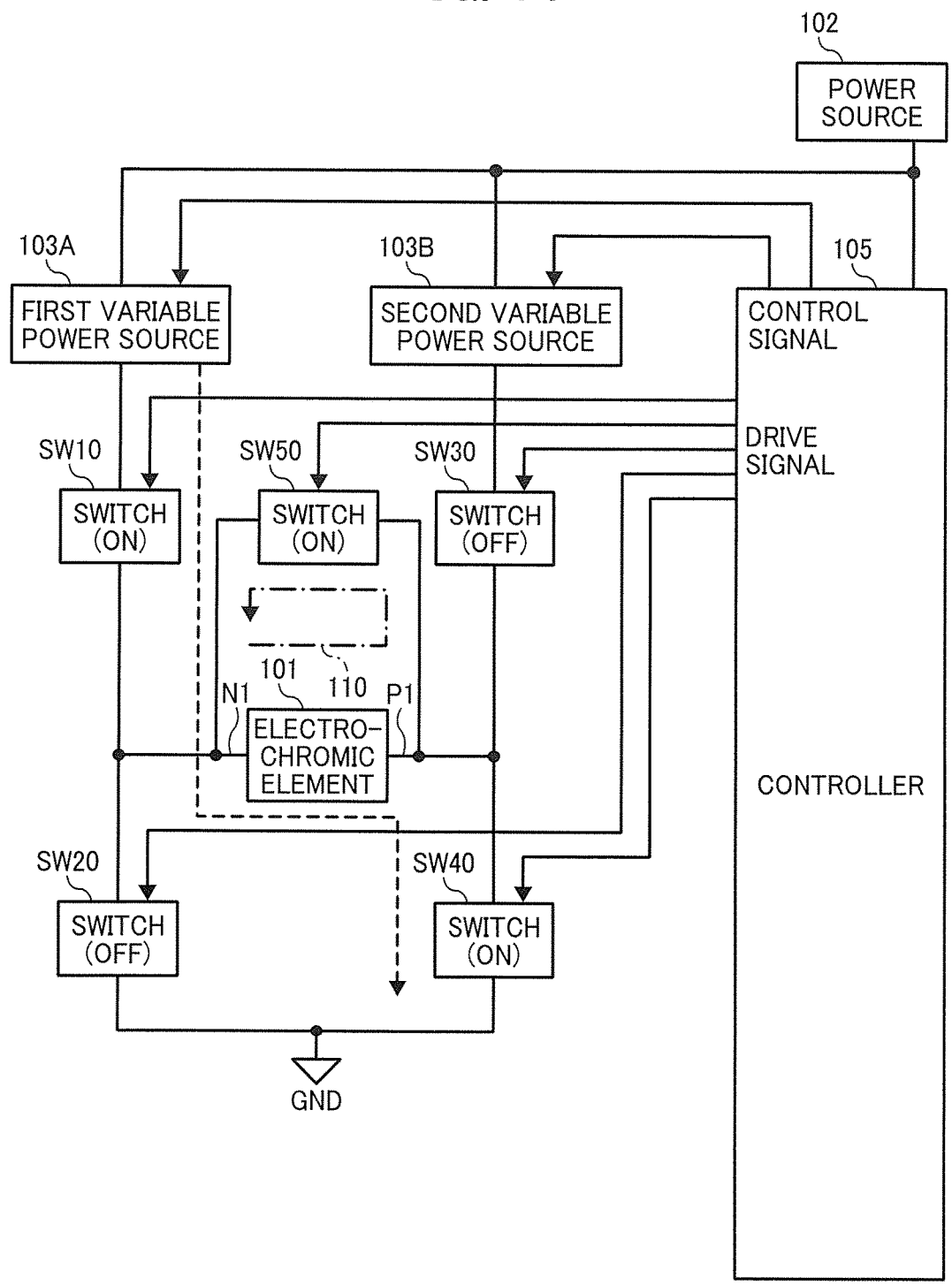
FIG. 14 is a block diagram of the electrochromic driving device illustrated in FIG. 6 in which the electrochromic element is caused to develop color by a fifth switch.

FIG. 14 is a block diagram of the electrochromic driving device in which the EC element 101 is caused to develop color by the fifth switch SW50. As illustrated in FIG. 14, the first switch SW10, the fourth switch SW40, and the fifth switch SW50 are turned on, and the second switch SW20 and the third switch SW30 are turned off. This is a case in which a forcible leakage path 110 is formed by the on resistance of the fifth switch SW50 or a resistance value suitable for a short-circuit path, to cause the EC element 101 to develop color.

The embodiment illustrated in FIG. 14 corresponds to the embodiment illustrated in FIG. 11 in which the fifth switch SW50 is turned on or a resistance value is added. A similar path can be formed when the fifth switch SW50 is turned on or a resistance value is added in the embodiment illustrated in FIG. 12.

Figure 15:
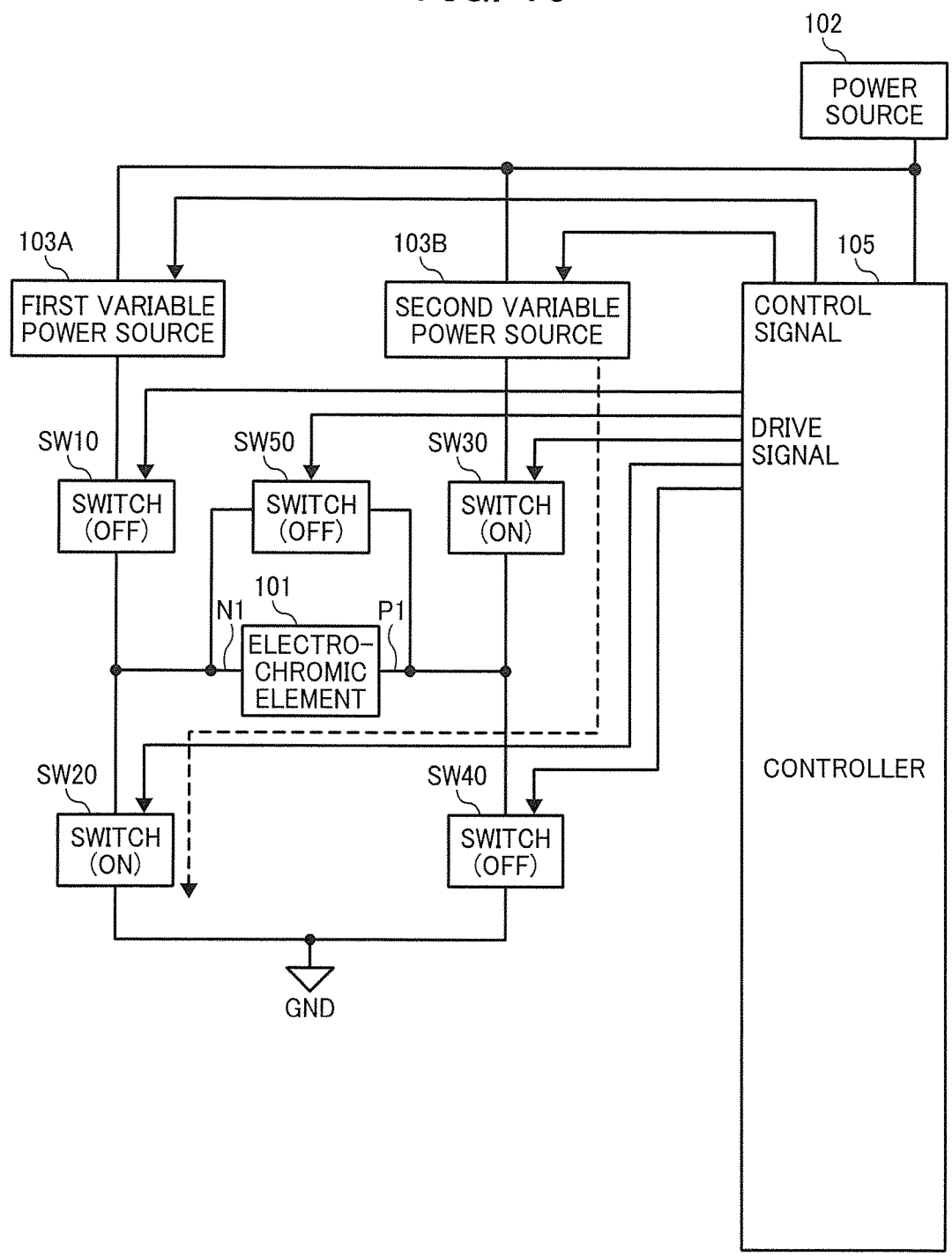
FIG. 15 is a block diagram of the electrochromic driving device illustrated in FIG. 6 in which the electrochromic element is caused to discharge color by the circuit reference potential.

FIG. 15 is a block diagram of the electrochromic driving device in which the EC element 101 is caused to discharge color by the circuit reference potential (GND). As illustrated in FIG. 15, the second switch SW20 and the third switch SW30 are turned on, and the first switch SW10, the fourth switch SW40, and the fifth switch SW50 are turned off. In this case, a current flows from the power source 102 through GND via the second variable power source 103B, the third switch SW30, the EC element 101 (from the second pole P1 to the first pole N1), and the second switch SW20, in this order, as shown by dashed arrow in FIG. 15.

Figure 16:
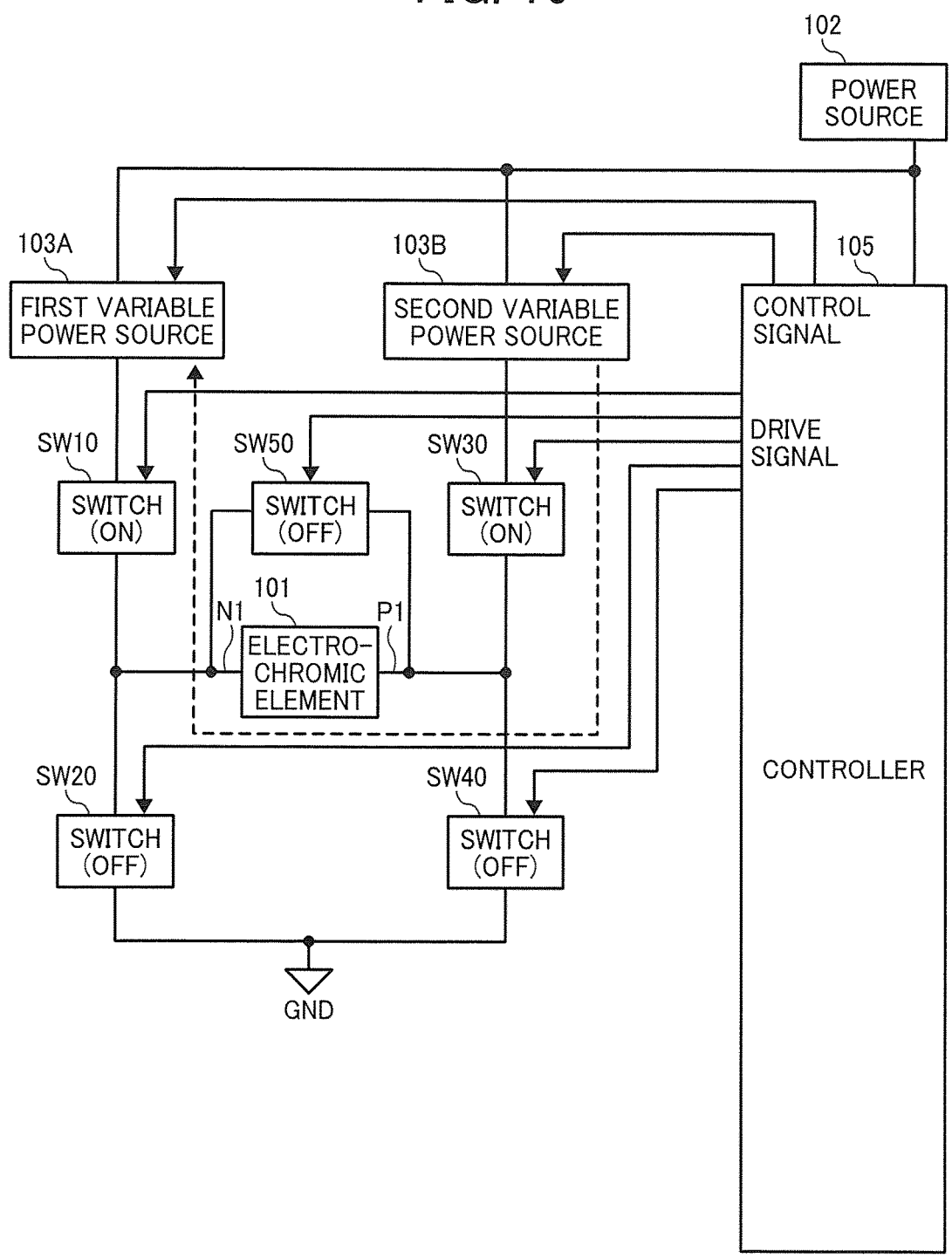
FIG. 16 is a block diagram of the electrochromic driving device illustrated in FIG. 6 in which a potential difference is applied to between the first variable power source and the second variable power source, to cause the electrochromic element to discharge color by the potential difference between the first pole and the second pole of the electrochromic element.

FIG. 16 is a block diagram of the electrochromic driving device in which a potential difference is applied to between the first variable power source 103A and the second variable power source 103B, to cause the EC element 101 to discharge color by the potential difference between the first pole N1 (oxidization pole) and the second pole P1 (reduction pole) thereof. As illustrated in FIG. 16, in a case in which the EC element 101 is caused to discharge color by the potential difference between both poles, the first switch SW10 and the third switch SW30 are turned on, and the second switch SW20, the fourth switch SW40, and the fifth switch SW50 are turned off. In this case, a current flows from the power source 102 through the first variable power source 103A via the second variable power source 103B, the third switch SW30, the EC element 101 (from the second pole P1 to the first pole N1), and the first switch SW10, in this order, as shown by dashed arrow in FIG. 16.

FIG. 17 is a table showing example combinations of the potential of the first variable power source 103A with that of the second variable power source 103B for color discharge operations. In a case in which the EC element 101 requires that the potential difference between the first pole N1 (oxidization pole) and the second pole P1 (reduction pole) be 2 V, the color discharge operation can be conducted under all the combination conditions described in FIG. 17.

Figure 18:
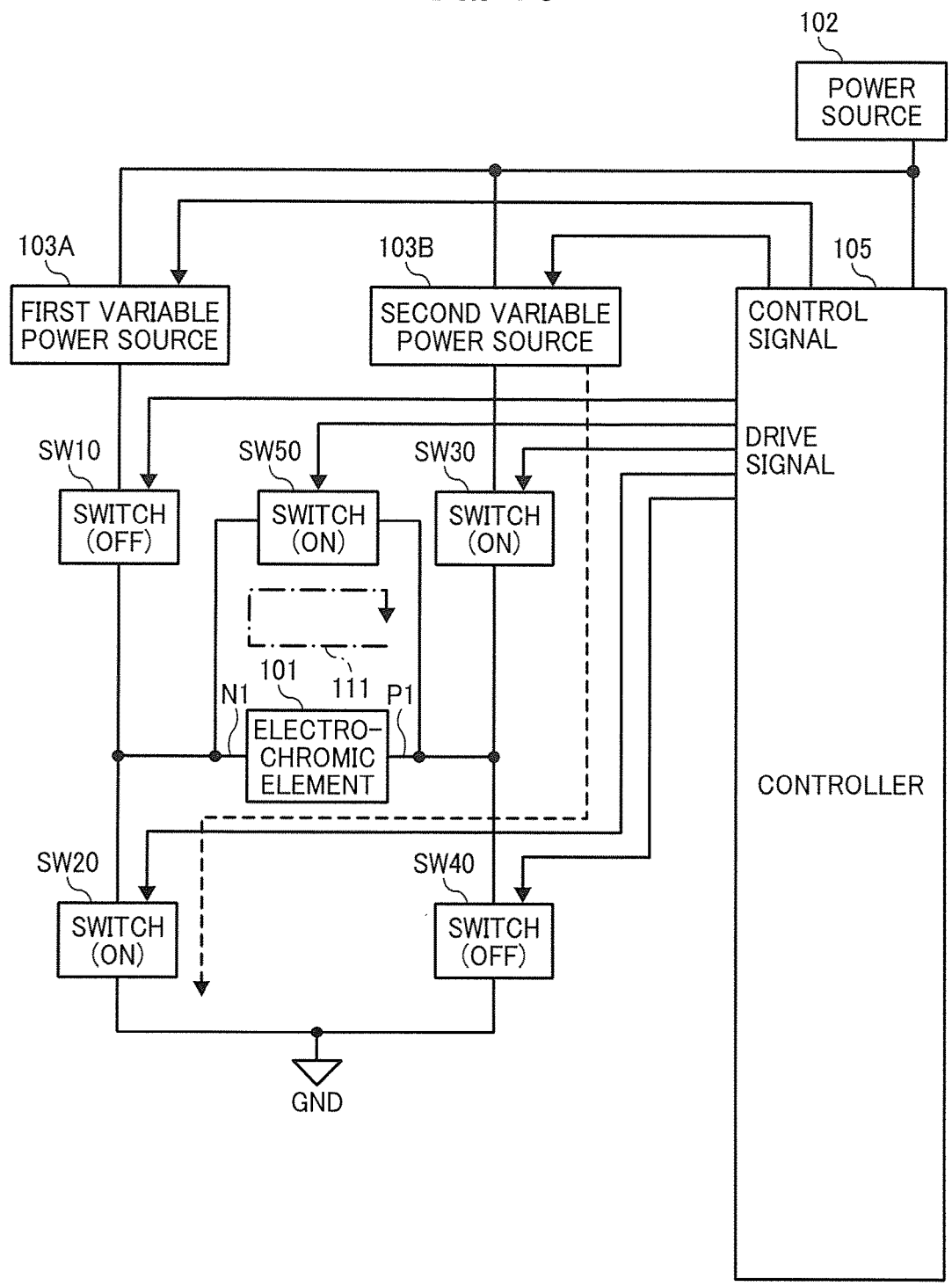
FIG. 18 is a block diagram of the electrochromic driving device illustrated in FIG. 6 in which the electrochromic element is caused to discharge color by the fifth switch.

FIG. 18 is a block diagram of the electrochromic driving device in which the EC element 101 is caused to discharge color by the fifth switch SW50. As illustrated in FIG. 18, the second switch SW20, the third switch SW30, and the fifth switch SW50 are turned on, and the first switch SW10 and the fourth switch SW40 are turned off. This is a case in which a forcible leakage path 110 is formed by the on resistance of the fifth switch SW50 or a resistance value suitable for a short-circuit path, to cause the EC element 101 to discharge color.

The embodiment illustrated in FIG. 18 corresponds to the embodiment illustrated in FIG. 15 in which the fifth switch SW50 is turned on or a resistance value is added. A similar path can be formed when the fifth switch SW50 is turned on or a resistance value is added in the embodiment illustrated in FIG. 16.

In the embodiments illustrated in FIGS. 11 and 12, the potential of the first pole N1 (oxidization pole) is relatively positive than that of the second pole P1 (reduction pole), and these potentials are exchangeable with each other according to another embodiment. In the embodiments illustrated in FIGS. 15 and 16, the second pole P1 (reduction pole) is relatively positive than that of the first pole N1 (oxidization pole), and these potentials are exchangeable with each other according to another embodiment.

The outputs from the first variable power source 103A and the second variable power source 103B are independently controllable by the controller 105. Therefore, it is possible to apply an arbitrary potential difference to between both poles of the EC element 101 with various application waveforms.

In the electrochromic driving device according to an embodiment of the present invention, it is possible to put the EC element 101 in a state in which an arbitrary voltage is applied to between both poles thereof. Therefore, as the potential between both poles in each state is detected, the detected potential can be parameter data for driving the EC element 101.

Figure 19:
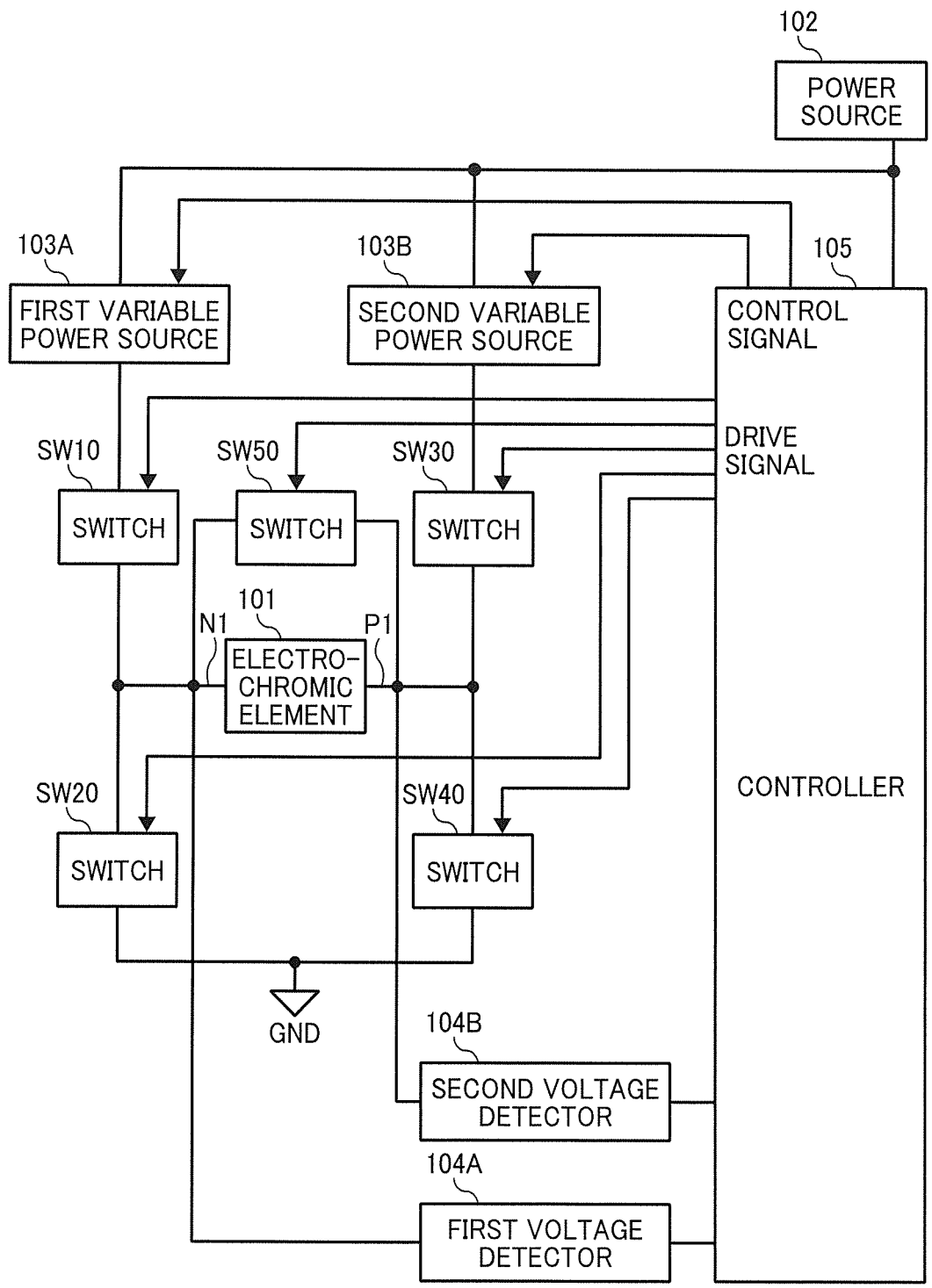
FIG. 19 is a block diagram of an electrochromic driving device according to another embodiment of the present invention equipped with a voltage detector that detects the potentials of both poles of the electrochromic element.

FIG. 19 is a block diagram of an electrochromic driving device according to an embodiment of the present invention equipped with a voltage detector that detects the potentials of both poles of the EC element 101. The electrochromic driving device illustrated in FIG. 19 has the same configuration as that illustrated in FIG. 6 except for further including a first voltage detector 104A and a second voltage detector 104B. The first voltage detector 104A detects the potential of the first pole N1 (oxidization pole) of the EC element 101 and outputs the detection result to the controller 105. The second voltage detector 104B detects the potential of the second pole P1 (reduction pole) of the first voltage detector 104A and outputs the detection result to the controller 105.

Each of the first voltage detector 104A and the second voltage detector 104B includes a device that converts analog signals to digital signals, such as an operational amplifier and an A/D converter, the configuration of which is non-limiting. The first voltage detector 104A and the second voltage detector 104B may be either external components independent from the controller 105 or internal A/D converters built in a microcontroller included in the controller 105. The controller 105 performs at least one of a sequence control, a feedback control, and a state detection of the electrochromic element, based on the potentials of both poles detected by the first voltage detector 104A and the second voltage detector 104B.

Figure 20:
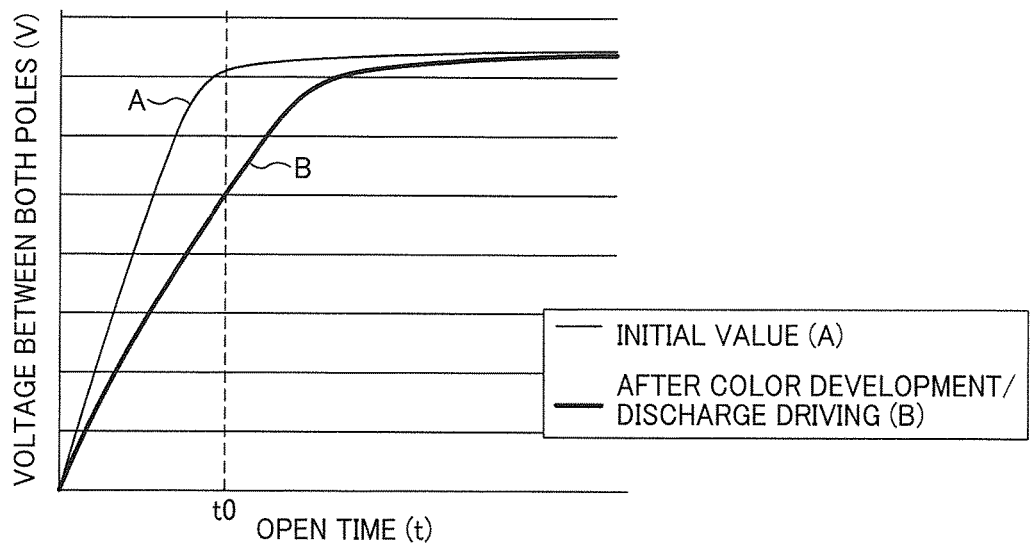
FIG. 20 is a graph showing recovery curves of the electrochromic elements according to some embodiments of the present invention, one of which is a new one having never been used and other is a used one having been driven a considerable number of times.

FIG. 20 is a graph showing recovery curves of the EC elements 101, one of which is a new one having never been used and other is a used one having been driven a considerable number of times. The vertical axis and the horizontal axis represent the voltage (V) between both poles and the open time (t), respectively. These recovery curves show a relation between the voltage between both poles and the open time until the voltage recovers to a potential specific to the structure of the EC element 101, when only the fifth switch SW50 is turned on and the first switch SW10, the second switch SW20, the third switch SW30, and the fourth switch SW40 are turned off, while the EC element 101 is discharging color.

In FIG. 20, the curve A represents a property of the new EC element 101, i.e., an initial value of the EC element 101. The curve B represents a property of the used EC element 101 having been driven a considerable number of times to develop and discharge color. It is clear from this graph that the curve B takes a much longer time than the curve A until recovering to the specific potential. It is possible to estimate the degree of deterioration of the EC element 101 by detecting the voltage between both poles at a preset reference time t0. The controller 105 adjusts driving parameters for color development and discharge based on that estimation.

When the EC element 101 is detected to have a property shown by the curve B, i.e., the voltage between both poles is lower than that of the curve A at the reference time t0, the controller 105 controls the first voltage detector 104A and the second voltage detector 104B to apply a color development/discharge voltage which is higher than that in the case of the curve A to the EC element 101 for a time longer than that that in the case of the curve A. Of course, it is possible that only one of the voltage and the time is changed from those in the case of the curve A.

Properties of multiple EC elements 101 are previously put into a table and stored in a memory inside the controller 105 to be used for varying voltage values and time values. The controller 105 specifies the EC element 101 from its recovery curve, selects control parameter from the table, and performs a necessary control for driving the EC element 101. Thus, it is possible to constantly driving the EC element 101 to develop or discharge color regardless of the degree of deterioration of the EC element 101.

In a case in which the voltage detectors have an impedance higher than a terminal impedance of the EC element 101, it is possible to detect density variation even while the density is maintained, owing to the memorizing ability of the EC element 101 generated by a discharge phenomenon occurring in an open circuit state.

Figure 21:
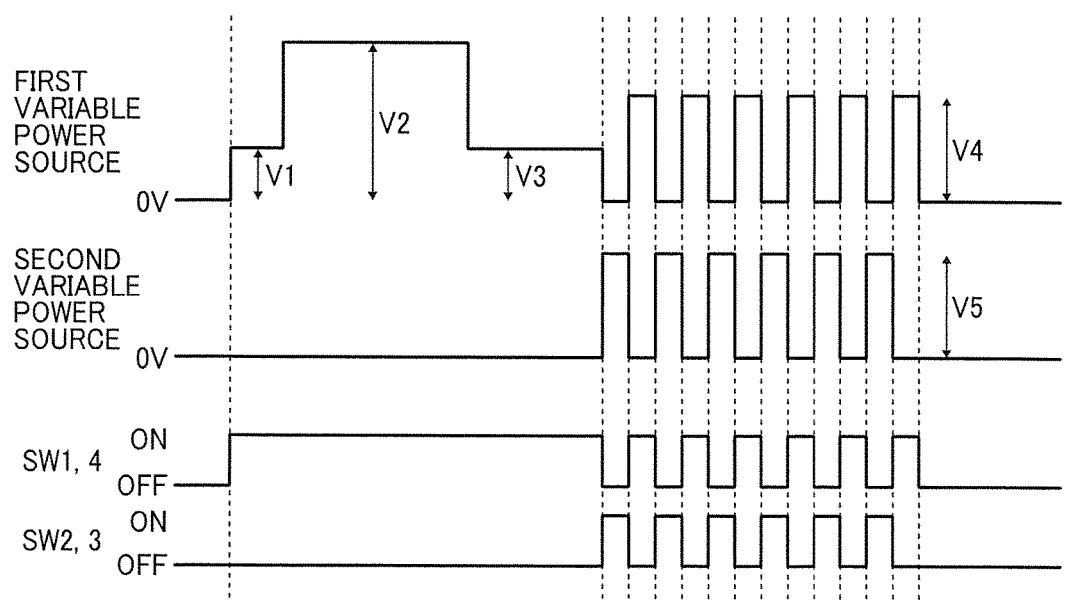
FIG. 21 is a graph showing examples of drive waveforms of the first variable power source with that of the second variable power source according to an embodiment of the present invention.

FIG. 21 is a graph showing examples of drive waveforms. As illustrated in FIG. 21, the first variable power source 103A applies a voltage V1, V2, V3, or V4 to the first pole N1 (oxidization pole) when the first switch SW10 and the fourth switch SW40 are turned on, but does not apply any voltage when the first switch SW10 and the fourth switch SW40 are turned off. The second variable power source 103B applies a voltage V5 to the second pole P1 (reduction pole) when the second switch SW20 and the third switch SW30 are turned on, but does not apply any voltage when the second switch SW20 and the third switch SW30 are turned off. The controller 105 controls the first variable power source 103A, the second variable power source 103B, and the drivers (switches), to cause the EC element 101 to develop color.

As the controller 105 controls the applied voltage and the on/off time of the drivers, it is possible to generate an applied waveform which is suitable for keeping quality, responsiveness, and color developing property of the EC element 101 based on the recovery curves detected by the first voltage detector 104A and the second voltage detector 104B.

Since the first voltage detector 104A and the second voltage detector 104B are connected to the electrodes of the EC element 101, it is possible that the controller 105 determines the behavior of the EC element 101 by detecting the potentials of the electrodes during both driving and non-driving periods of the EC element 101.

It is also possible that the controller 105 detects density variation of the EC element 101, in addition to the potentials of both poles, after color development. And when the detected density is higher or lower than a specific density, the controller 105 performs an additional drive operation to retain the color development density.

As described above, the electrochromic driving device according to the third embodiment of the present invention includes: the EC element 101; the power source 102; the first switch SW10 disposed between the power source 102 and the first pole N1 (oxidization pole) of the EC element 101; the second switch SW20 disposed between the first pole N1 (oxidization pole) of the EC element 101 and a circuit reference potential (GND); the third switch SW30 disposed between the power source 102 and the second pole P1 (reduction pole) of the EC element 101; the fourth switch SW40 disposed between the second pole P1 (reduction pole) of the EC element 101 and the circuit reference potential (GND); the fifth switch SW50 to short-circuit or open the first pole N1 (oxidization pole) and the second pole P1 (reduction pole); and the controller 105 to control the first to fifth switches SW10 to SW50.

This electrochromic driving device is capable of efficiently driving the electrochromic element to develop or discharge color without any detection circuit used for a feedback control, etc.

Fourth Embodiment

An EC driving device according the fourth embodiment of the present invention has the same configuration as the above-described EC driving device illustrated in FIG. 19 according to the third embodiment. Specifically, this EC driving device includes a power source 102 to supply electric power, a first variable power source 103A, a second variable power source 103B, the EC element 101, a first switch SW10, a second switch SW20, a third switch SW30, a fourth switch SW40, a fifth switch SW50, a first voltage detector 104A, a second voltage detector 104B, and a controller 105.

The first variable power source 103A receives electric power supply from the power source 102. The first variable power source 103A is connected to a series circuit of the first switch SW10 and the second switch SW20. The second switch SW20 is connected to a circuit reference potential (GND).

The second variable power source 103B receives electric power supply from the power source 102. The second variable power source 103B is connected to a series circuit of the third switch SW30 and the fourth switch SW40. The fourth switch SW40 is connected to the circuit reference potential (GND).

The output terminal of the first switch SW10 is connected to one terminal of a parallel circuit of the fifth switch SW50 and the EC element 101. The other terminal of the parallel circuit of the fifth switch SW50 and the EC element 101 is connected to the output terminal of the third switch SW30.

As the first to fifth switches SW10 to SW50 are connected in the above-described manner, upon transmission of drive signals from the controller 105 to the first to fifth switches SW10 to SW50, both poles of the EC element 101 are applied with different amounts of charge. The first to fifth switches SW10 to SW50 may be hereinafter referred to as element drivers.

The first voltage detector 104A is connected to the first pole N1 of the EC element 101 to detect a voltage and outputs the detection result to the controller 105. The second voltage detector 104B is connected to the second pole P1 of the EC element 101 to detect a voltage and outputs the detection result to the controller 105.

It is possible that the controller 105 generates control signals for controlling the first variable power source 103A and the second variable power source 103B based on the detection results from the first voltage detector 104A and the second voltage detector 104B through a feedback control.

The controller 105 outputs control signals to the first variable power source 103A and the second variable power source 103B. The controller 105 outputs drive signals to the first switch SW10, the second switch SW20, the third switch SW30, the fourth switch SW40, and the fifth switch SW50.

The fifth switch SW50 short-circuits both poles of the EC element 101 to equilibrate the potentials of the first electrode 404A and the second electrode 404B. Since an ionic reaction occurs not only between the first electrode 404A and the second electrode 404B but also inside the first electrode 404A and the second electrode 404B, both electrodes never become the same potential even if they are equilibrated. The potential between both poles of the EC element 101 is specific to the element configuration and the number of driving of the element.

The fifth switch SW50 is used to detect the potential difference between both poles of the EC element 101. The first pole N1 and the second pole P1 of the EC element 101 are connected to the first voltage detector 104A and the second voltage detector 104B, respectively.

Each of the first switch SW10, the second switch SW20, the third switch SW30, the fourth switch SW40, and the fifth switch SW50 may be a mechanical switch (e.g., relay), an analog switch (e.g., semiconductor), and a MOS-Tr (Metal Oxide Semiconductor Transistor).

In color development operations, the controller 105 outputs drive signals for short-circuiting the first switch SW10 and the fourth switch SW40 and opening the other switches. In this case, the electric power supplied from the power source 102 reaches GND via the first variable power source 103A, the first switch SW10, the first pole N1 of the EC element 101, the EC element 101, the second pole P1 of the EC element 101, and the fourth switch SW40, in this order. In this case, the controller 105 outputs a control signal to the first variable power source 103A, and the first variable power source 103A varies a voltage according to the control signal.

In color discharge operations, the controller 105 outputs drive signals for short-circuiting the second switch SW20 and the third switch SW30 and opening the other switches. In this case, the electric power supplied from the power source 102 reaches GND via the second variable power source 103B, the third switch SW30, the second pole P1 of the EC element 101, the EC element 101, the first pole N1 of the EC element 101, and the second switch SW20, in this order. In this case, the controller 105 outputs a control signal to the second variable power source 103B, and the second variable power source 103B varies a voltage according to the control signal.

Figure 22:
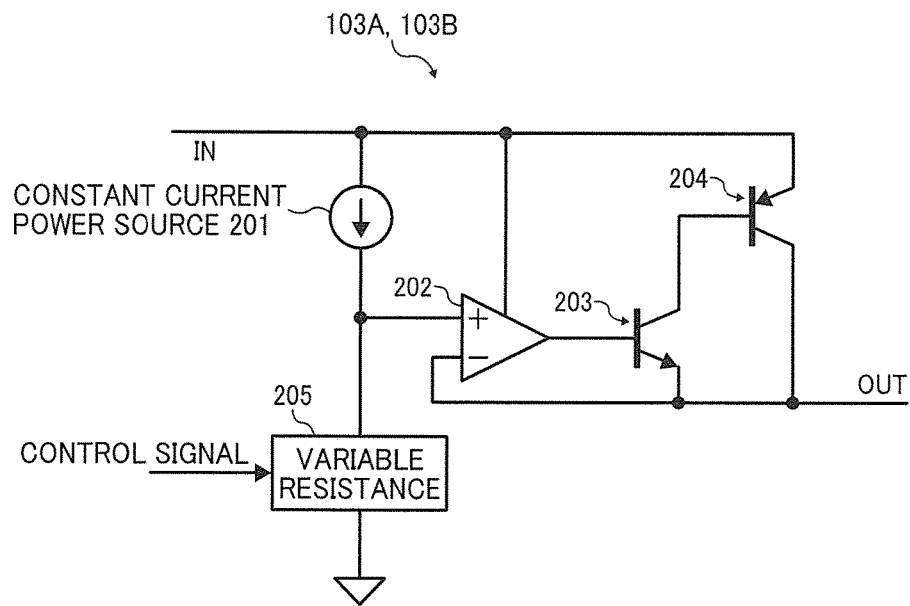
FIG. 22 is a schematic view illustrating a configuration of the first variable power source and the second variable power source according to an embodiment of the present invention.

FIG. 22 is a schematic view illustrating a configuration of the first variable power source 103A and the second variable power source 103B. The first variable power source 103A and the second variable power source 103B have the same configuration. Therefore, the following descriptions are made with reference to the first variable power source 103A only.

As illustrated in FIG. 22, the first variable power source 103A includes a constant current power source 201, an operational amplifier 202 connected to the constant current power source 201, an NPN transistor 203, a PNP transistor 204, and a variable resistance 205.

The plus terminal of the operational amplifier 202 is connected to an input IN. The output terminal of the operational amplifier 202 is connected to the base terminal of the NPN transistor 203. The collector terminal of the NPN transistor 203 is connected to the base terminal of the PNP transistor 204. The emitter terminal of the PNP transistor 204 is connected to the input IN. The collector terminal of the PNP transistor 204 and the emitter terminal of the NPN transistor 203 are connected to the minus terminal of the operational amplifier 202.

The output terminal of the constant current power source 201 is connected to the plus terminal of the operational amplifier 202 and the variable resistance 205. The variable resistance 205 varies its resistance value according to a control signal from the controller 105.

Figure 23:
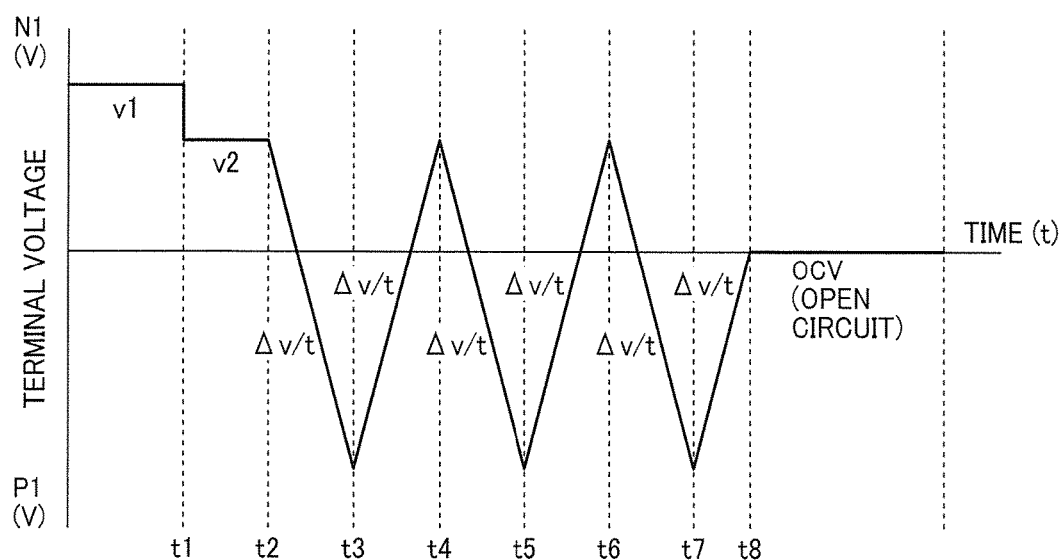
FIG. 23 is a graph showing operations of the first variable power source and the second variable power source according to an embodiment of the present invention.

FIG. 23 is a graph showing operations of the first variable power source 103A and the second variable power source 103B. The first variable power source 103A and the second variable power source 103B operate in the same manner. Therefore, the following descriptions are made with reference to the first variable power source 103A only. In FIG. 23, the vertical axis and the horizontal axis represent the terminal voltage (V) and the time (t), respectively.

As illustrated in FIG. 23, the first variable power source 103A applies a voltage v1 from the start of voltage application until a time t1 has elapsed and a voltage v2 that is smaller than the voltage v1 until a time t2 has elapsed, based on the control signal from the controller 105.

The first variable power source 103A continues applying a voltage from the time t2 to a time t3 while decreasing the applied voltage with time from the voltage v2 to a voltage v4 that is lower than the terminal voltage at a declination of −Δv/t. The first variable power source 103A further continues applying a voltage from the time t3 to a time t4 while increasing the applied voltage with time from the voltage v4 to the voltage v2 at a declination of +Δv/t. The first variable power source 103A repeats this operation multiple times, for example, 3 times, based on the control signal from the controller 105.

At a time t8, the controller 105 outputs drive signals for opening all the first to fifth switches SW10 to SW50 to put the EC element 101 in an open circuit state (OCV) and stabilizing the EC element 101.

In the present embodiment, the drive waveform is a triangular waveform, but is variable according to the properties of the EC element 101.

As described above, the electrochromic driving device according to the fourth embodiment of the present invention includes: the first variable power source 103A and the second variable power source 103B that vary the output voltages with time based on control signals; element drivers (switches) that change the pole of the electrochromic element 101 to which the output voltages from the first variable power source 103A and the second variable power source 103B are applied based on drive signals; and the controller 105 that generates the control signals and the drive signals.

Since the drive waveform is a waveform which varies with time unlike a square waveform, the EC element 101 is never applied with an inrush current. Thus, the EC element 101 is prevented from deteriorating while providing low power consumption and high responsiveness.

In the embodiment illustrated in FIG. 6, the number of variable power sources is two, but may be one depending on the circuit configuration.

In the embodiment illustrated in FIG. 22, the variable power source includes a regulator having a constant current power source, but the circuit configuration is not limited thereto so long as the output voltage is variable with time.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An electrochromic driving device, comprising:
   an electrochromic element having a first pole and a second pole;
   a variable power source to variably supply electric power to the electrochromic element;
   a driving switch to connect each of the first pole and the second pole of the electrochromic element to the variable power source or a circuit reference potential;
   a short-circuiting switch to short-circuit or open the first pole and the second pole; and
   a controller to control the driving switch, the short-circuiting switch, and the variable power source;
   wherein the variable power source includes:
      a first variable power source to variably supply electric power to the first pole; and
      a second variable power source to variably supply electric power to the second pole, and
   wherein the controller causes the electrochromic element to develop color or discharge color based on a potential difference between the first variable power source and the second variable power source.

2. The electrochromic driving device of claim 1, further comprising:
   a first voltage detector to detect a first potential of the first pole and output the first potential to the controller; and
   a second voltage detector to detect a second potential of the second pole and output the second potential to the controller.

3. The electrochromic driving device of claim 2,
   wherein the controller:
   turns on the short-circuiting switch to short-circuit the first pole and the second pole;
   controls the driving switch to connect one of the first pole and the second pole to the circuit reference potential and the other to the variable power source; and
   forcibly equilibrates charges in the electrochromic element when the electrochromic element develops color or discharges color,
   wherein the first voltage detector and the second voltage detector detect the first potential and the second potential, respectively, in an open circuit state when the electrochromic element develops color or discharges color.

4. The electrochromic driving device of claim 3, wherein the controller performs at least one of a sequence control, a feedback control, and a state detection of the electrochromic element, based on the first potential and the second potential detected by the first voltage detector and the second voltage detector, respectively.

5. The electrochromic driving device of claim 1, wherein the first variable power source and the second variable power source each have an arbitrary potential.

6. An electrochromic driving device, comprising:
   an electrochromic element;
   a variable power source to output a voltage to the electrochromic element while varying the voltage with time according to a control signal;
   an element driver to change a pole of the electrochromic element to which the voltage output from the variable power source is applied according to a drive signal, wherein the element driver includes a switch to short-circuit both poles of the electrochromic element;
   a controller to generate the control signal and the drive signal; and
   a voltage detector to detect a voltage between said both poles of the electrochromic element which have been short-circuited by the switch and in an equilibrium state,
   wherein the controller feedback-controls the variable power source based on a detection result from the voltage detector.

7. The electrochromic driving device of claim 6, wherein the controller performs at least one of a sequence control, a feedback control, and a state detection of the electrochromic element, based on the voltage detected by the voltage detector.

8. The electrochromic driving device of claim 6,
wherein the variable power source includes:
a first variable power source to variably supply electric power to a first pole of the electrochromic element; and
a second variable power source to variably supply electric power to a second pole of the electrochromic element, and
wherein the controller causes the electrochromic element to develop color or discharge color based on a potential difference between the first variable power source and the second variable power source.

9. The electrochromic driving device of claim 8, wherein the first variable power source and the second variable power source each have an arbitrary potential.

10. The electrochromic driving device of claim 8, wherein the controller outputs control signals to the first variable power source and the second variable power source, respectively, to control independently an output of the first variable power source and an output of the second variable power source, respectively, and thereby establish said potential difference between the first variable power source and the second variable power source.

11. An electrochromic driving device, comprising:
an electrochromic element;
a variable power source to output a voltage to the electrochromic element;
an element driver to change a pole of the electrochromic element to which the voltage output from the variable power source is applied according to a drive signal; and
a controller to generate and output the drive signal and a control signal, the variable power source varying the voltage, output to the electrochromic element, with time according to the control signal from the controller.

12. The electrochromic driving device of claim 11, further comprising:
a voltage detector to detect a voltage between both poles of the electrochromic element which have been short-circuited by the switch and in an equilibrium state,
wherein the controller feedback-controls the variable power source based on a detection result from the voltage detector.

13. The electrochromic driving device of claim 12, wherein the controller performs at least one of a sequence control, a feedback control, and a state detection of the electrochromic element, based on the voltage detected by the voltage detector.

14. The electrochromic driving device of claim 11,
wherein the variable power source includes:
a first variable power source to variably supply electric power to a first pole of the electrochromic element; and
a second variable power source to variably supply electric power to a second pole of the electrochromic element, and
wherein the controller causes the electrochromic element to develop color or discharge color based on a potential difference between the first variable power source and the second variable power source.

15. The electrochromic driving device of claim 14, wherein the first variable power source and the second variable power source each have an arbitrary potential.

* * * * *